US007646752B1

United States Patent
Periyalwar et al.

(10) Patent No.: US 7,646,752 B1
(45) Date of Patent: Jan. 12, 2010

(54) MULTI-HOP WIRELESS BACKHAUL NETWORK AND METHOD

(75) Inventors: Shalini Periyalwar, Nepean (CA); Hang Zhang, Nepean (CA); Glenn Algie, Ottawa (CA); Peiying Zhu, Kanata (CA); Robert Matyas, Ottawa (CA); Claude Royer, Hull (CA); Bill Gage, Stittsville (CA); James Naden, Hertford (GB); Alauddin Javed, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1149 days.

(21) Appl. No.: 10/747,942

(22) Filed: Dec. 31, 2003

(51) Int. Cl.
*H04W 4/00* (2009.01)
*H04B 7/185* (2006.01)
*H04L 12/26* (2006.01)
*H04L 12/28* (2006.01)
*H04W 40/00* (2009.01)
*H04W 72/00* (2009.01)

(52) U.S. Cl. .................. 370/338; 370/216; 370/254; 370/329; 370/352; 370/397; 370/409; 455/13.1; 455/445; 455/450; 455/452.1

(58) Field of Classification Search .......... 370/216, 370/254, 329, 338, 352, 397, 409; 455/13.1, 455/445, 450, 452.1
See application file for complete search history.

(56) References Cited

U.S. PATENT DOCUMENTS 5,428,636 A * 6/1995 Meier .................. 375/132
5,495,472 A * 2/1996 Ohara .................. 370/224
5,504,746 A * 4/1996 Meier .................. 370/256
6,412,006 B2 * 6/2002 Naudus ................ 709/227
6,480,524 B1   11/2002 Smith et al. .......... 375/140
6,718,394 B2 *  4/2004 Cain ................... 709/242
6,826,165 B1 * 11/2004 Meier et al. .......... 370/338
6,870,846 B2 *  3/2005 Cain ................... 370/392
6,954,790 B2 * 10/2005 Forslow ............... 709/227
7,058,050 B2 *  6/2006 Johansson et al. ...... 370/386
7,120,119 B2 * 10/2006 Frelechoux et al. ..... 370/238
7,180,875 B1 *  2/2007 Neumiller et al. ...... 370/329
2001/0055298 A1 * 12/2001 Baker et al. .......... 370/349
2002/0159409 A1 * 10/2002 Wolfe et al. .......... 370/329
2004/0179555 A1 *  9/2004 Smith ................ 370/521
2005/0190700 A1 *  9/2005 Melpignano .......... 370/244

* cited by examiner

*Primary Examiner*—Alpus H Hsu

(57) ABSTRACT

Some embodiments of the invention provide an implementation for a multi-hop wireless backhaul network. These embodiments can advantageously be deployed in dense urban areas and/or co-located with wireless access nodes, such as base-stations of a cellular wireless communication system. Preferably wireless links between constituent network nodes are set-up hierarchically. A basic result of this is that peer-to-peer (child-to-child) communication is generally prohibited and circuits are forced to conform to a topology. The multi-hop wireless backhaul network may be used to carry delay sensitive, high-density last mile circuit traffic over Non-Line-Of-Sight (NLOS) broadband radio links. Moreover, some embodiments of the invention provide a method of path-healing for re-routing of circuit traffic from circuits that have experienced catastrophic failures.

46 Claims, 13 Drawing Sheets

MULTI-HOP WIRELESS BACKHAUL NETWORK AND METHOD

FIELD OF THE INVENTION

This invention relates generally to communication systems and, in particular, to backhaul networks.

BACKGROUND

Backhaul networks serve to efficiently transport large amounts of data across and between communication systems. The data carried in a backhaul network typically originates from (or is destined to) multiple sources in one geographic area and is destined for (or originates from) multiple other sources located in other geographic areas. As such, a backhaul network must provide aggregation points for data in each geographic area and efficiently transport aggregations of data between different geographic areas.

Knowledge about the ultimate destinations (e.g. particular end-user devices, web-servers, etc.) of data is not required since backhaul networks do not provide direct access to individual end-users. An aggregation point, provided by backhaul network, is typically co-located with an end-user distribution and access system (e.g. a cellular base-station) that provides access to end-users. The distribution and access system is responsible for parsing aggregations of data and delivering respective portions of the aggregate data to respective end-users.

Backhaul networks have been implemented using a number of technologies, such as wireline, optical links, Point-To-Point (PTP) microwave links, and Point-to-Multi-Point (PMP) broadcast radios. Each of these technologies has a number of flaws that make deployment restrictive and expensive in dense urban areas.

Wireline and optical links require the expensive installation of a physical medium (e.g. twisted pair copper lines, optical fibers, etc.) to carry signals between backhaul network nodes. In dense urban areas, where real estate is relatively expensive and the disruption of daily life is unwelcome, the placement of supporting equipment and the physical medium is a problem that network planners and operators would like to avoid. Wireline and optical links become even less cost-effective for the amount of capacity provided beyond 3 to 4 T1's of capacity.

PTP microwave links appear to be less expensive than wireline and optical links. However, PTP microwave based systems are more expensive to integrate into wireless access systems (e.g. cellular wireless networks). PTP microwave based systems also require absolute Line-Of-Sight (LOS) between any two nodes intended to have a communication link and a dedicated frequency channel for each such link. The absolute LOS requirement is an impractical requirement in dense urban areas. The need for a dedicated frequency channel for each communication link introduces a number of problems discussed below.

When employing PTP microwave links in a backhaul network of any size frequency channel planning/assignment is essential to ensure frequency channel overlap and the communication collisions this would cause do not occur. This in turn leads to a duplication of equipment in each backhaul network node, in that each backhaul node must have a unique radio unit for each communication link it is intended to support. Consequently, PTP microwave based systems are difficult to expand because frequency assignments must be adjusted and new radio equipment added to existing backhaul network nodes every time there is a requirement to increase capacity.

Point-to-Multi-Point (PMP) broadcast radios, such as PMP LMDS (Local Multipoint Distribution Service), are typically only useful in a high-density subset of deployments that satisfy strict LOS requirements. In fact, employing PMP broadcast radios actually enforces a less flexible network topology than the use of PTP links in that PMP broadcast radios do not easily lend themselves to circuit emulation and typically do not provide very high capacity.

SUMMARY OF THE INVENTION

According to one broad aspect, the invention provides a multi-hop wireless backhaul network comprising: at least one NAN (network access node); a plurality of BNs (base nodes); a plurality of AGNs (aggregation nodes) each performing a switching function in relaying traffic between at least one of the base nodes and at least one of the network access nodes; wherein a hierarchical topology of active wireless connections is established with the at least one network access node at the top of the topology, and the base nodes at the bottom of the topology.

In some embodiments, the multi-hop wireless backhaul network in combination with an access network comprising a plurality of access network nodes for which the multi-hop wireless backhaul network is providing backhaul functionality.

In some embodiments, at least some of the access network nodes are co-located and connected to or integrated with respective nodes of the multi-hop wireless backhaul network.

In some embodiments, the access network is a cellular wireless access network, and each access network node is a base station transceiver.

In some embodiments, the multi-hop wireless backhaul network adapts to establish a plurality of virtual circuits through said hierarchical topology, each virtual circuit having an allocated bandwidth for delay-sensitive traffic, at least some of the virtual circuits being multi-hop virtual circuits.

In some embodiments, each virtual circuit has a first circuit end-point in one of the at least one NAN, and has a circuit second end-point in either a BN of said plurality of BNs or an AGN of said plurality of AGNs.

In some embodiments, each virtual circuit passes through one of said at least one NAN and has a first circuit end-point external to the BNs, AGNs, and at least one NAN, and has a second circuit end-point in either a BN of said plurality of BNs or an AGN of said plurality of AGNs.

In some embodiments, the multi-hop wireless backhaul network adapts to establish a plurality of virtual circuits through said hierarchical topology, each virtual circuit having an allocated bandwidth for delay-sensitive traffic, at least some of the virtual circuits being multi-hop virtual circuits, wherein each virtual circuit either has a first circuit end-point in one of the at least one NAN or passes through one of the at least one NAN to an external end-point, and has a second circuit end-point in either a BN of said plurality of BNs or an AGN of said plurality of AGNs, which second circuit end-point is combined with, co-located with or locally connected to an access network node of said access network and provides backhaul capacity for the access network node.

In some embodiments, the multi-hop wireless backhaul network further comprises a scheduler which performs a scheduling operation for nodes in the topology and transmits at least one message containing resource assignment information.

In some embodiments, the at least one message comprises identifiers of two nodes for an active connection, and at least one of: time slots of communications, an encoding format, a signaling format, a modulated format and transmission power.

In some embodiments, A multi-hop wireless backhaul network further comprises a scheduler on each node in the network, the schedulers collectively performing a scheduling operation to determine for each connection which two nodes are involved in the connection; and at least one of: time slots of communications, an encoding format, a signaling format, a modulated format and transmission power.

In some embodiments, at least one BN or AGN is a second end-point for two or more virtual circuits.

In some embodiments, at least two or more virtual circuits as established on respective distinct active wireless connections from the BN or AGN.

In some embodiments, each virtual circuit is an end-to-end layer 2 circuit emulation, and wherein for each multi-hop virtual circuit.

In some embodiments, the multi-hop wireless backhaul network adapts to dynamically allocate bandwidth to each of the active connections.

In some embodiments, each node maintains respective topology information identifying at least any active connections the node is participating in or any nodes with which the node has an active connection.

In some embodiments, each AGN comprises a plurality of spatially switched antennas, and a transceiver operating in a TDM (time division multiplex) basis on the plurality of spatially switched antennas.

In some embodiments, each BN comprises a plurality of spatially switched antennas, and a transceiver operating in a TDM (time division multiplex) basis on the plurality of spatially switched antennas.

In some embodiments, each NAN comprises a plurality of antennas in a multi-sector antenna arrangement and a respective transceiver operating on each sector.

In some embodiments, each active connection is established between a respective pair of said antennas on two nodes in the network, and wherein each connection is allocated respective active time slots during which the connection is active.

In some embodiments, the multi-hop wireless backhaul network further adapts to establish a plurality of alternate connections in addition to the active connections in said hierarchical topology.

In some embodiments, the multi-hop wireless backhaul network further adapts to perform automatic path healing upon failure of an active connection or a node in the network, using at least one of the plurality of alternate connections.

In some embodiments, at least some of the BNs have respective alternate connections to either an AGN of said plurality of AGNs or to a NAN of said at least one NAN, and wherein at least some of the AGNs have respective alternate connections to either another AGN of said plurality of AGNs or to a NAN of said at least one NAN.

In some embodiments, the multi-hop wireless backhaul network adapts to allocate at least a signalling and/or ranging bandwidth for each alternate connection.

In some embodiments, the multi-hop wireless backhaul network adapts to detect when a failure has occurred affecting at least one of said active connections, and to maintain communication between the endpoints of the connection by using at least one alternate connection.

In some embodiments, the multi-hop wireless backhaul network adapts to perform automatic path healing upon failure by: a node in the hierarchy directly below the failure establishing an active connection over an alternate connection from the node.

In some embodiments, for a virtual circuit using the active connection or node which failed, performing automatic path healing comprises: moving the virtual circuit to use at least one alternate connection, and scheduling bandwidth for the virtual circuit along at least each connection to form part of the virtual circuit after moving which was not previously part of the virtual circuit.

In some embodiments, the multi-hop wireless backhaul network further comprises a scheduler which performs a scheduling operation on the nodes in the network and transmits one or more resource assignment messages containing resource assignment information.

In some embodiments, the resource assignment message comprises identifiers of two nodes for a connection, and at least one of: time slots of communications, an encoding format, a signaling format, a modulated format and transmission power.

In some embodiments, the scheduler generates new resource assignment information as part of the automatic path healing.

In some embodiments, the multi-hop wireless backhaul network further comprises a scheduler on each node in the network, the schedulers collectively performing a scheduling operation to determine for each connection which two nodes are involved in the connection; and at least one of: time slots of communications, an encoding format, a signaling format, a modulated format and transmission power.

In some embodiments, after a failure, the schedulers collectively perform a new scheduling operation.

In some embodiments, each AGN and each BN is adapted to perform a ranging function to identify network nodes with which the AGN/BN can establish a connection.

In some embodiments, upon at least one of power up, initialization and command, each AGN and each BN is adapted to perform a ranging function to identify another node with which the AGN/BN can establish a connection.

In some embodiments, upon at least one of power up, initialization and command, each AGN and each BN is adapted to perform a ranging function to identify another node with which the AGN/BN can establish an active connection as part of said hierarchical topology, and in an attempt to identify at least one alternate node with which the AGN/BN can establish an alternate connection.

In some embodiments, each alternate connection is established between a respective pair of antennas, and wherein each alternate connection is allocated respective signalling time slots during which the alternate connection is available for ranging or signalling.

In some embodiments, each NAN dynamically allocates bandwidth to each AGN and/or BN with which the NAN has an active connection, and each AGN allocates bandwidth to each AGN and/or BN with which the AGN has an active connection.

In some embodiments, the multi-hop wireless backhaul network further adapts to establish a plurality of alternate connections in addition to the active connections in said hierarchical topology.

In some embodiments, the multi-hop wireless backhaul network further adapts to perform automatic path healing upon failure of an active connection or a node in the network, using at least one of the plurality of alternate connections.

In some embodiments, the multi-hop wireless backhaul network adapts to dynamically allocate a bandwidth at least for signalling and/or ranging each alternate connection, and to allocate bandwidth for traffic for each alternate connection employed in path healing.

In some embodiments, the multi-hop wireless backhaul network in combination with an element management system adapts to provide management functions for the multi-hop wireless backhaul network.

In some embodiments, the element management system is connected to the multi-hop wireless backhaul network via another transport network.

In some embodiments, the element management system is connected to the multi-hop wireless backhaul network via a metro network.

In some embodiments, the multi-hop wireless backhaul network in combination with an element management system adapts to perform management functions for the multi-hop wireless backhaul network connected to the multi-hop wireless backhaul network via a metro network, and further comprising a base station controller co-located with the element management system, the base station controller providing a control operation for the base station transceivers.

In some embodiments, the multi-hop wireless backhaul network in combination with an element management system adapts to perform management functions for the multi-hop wireless backhaul network connected to the multi-hop wireless backhaul network via a metro network, and further comprising a base station controller co-located with or locally connected to the element management system, the base station controller providing a control operation for the base station transceivers, wherein each the first end-point of each virtual circuit is in the element management system.

In some embodiments, each virtual circuit is an Ethernet virtual circuit.

According to another broad aspect, the invention provides a NAN (network access node) for use in multi-hop wireless backhaul network the NAN comprising: an interface to another transport network; for each of at least two sectors, each transceiver and antenna establishing an active connection with another node in the network, a respective antenna and a respective transceiver; the NAN being adapted to act as a wireless end-point for a plurality of virtual circuits through said network using said connections, each virtual circuit having an allocated bandwidth for delay-sensitive traffic, at least some of the virtual circuits being multi-hop virtual circuits.

In some embodiments, the NAN further adapts to act as a circuit emulation end-point for the plurality of virtual circuits.

In some embodiments, the NAN adapts to communicate on each connection using a respective schedule.

In some embodiments, the schedule is in accordance with a received resource assignment comprising, for each connection, and at least one of: time slots of communications, an encoding format, a signaling format, a modulated format and transmission power.

In some embodiments, each virtual circuit is an end-to-end layer 2 circuit emulation.

In some embodiments, the NAN further adapts to establish at least one alternate connection in addition to the active connections.

In some embodiments, the NAN adapts to allocate at least a signalling and/or ranging bandwidth for each alternate connection.

In some embodiments, for each antenna, time slots are scheduled for and/or ranging functions.

In some embodiments, each alternate connection is scheduled respective signalling time slots during which the connection is available for ranging and/or signalling.

In some embodiments, each NAN dynamically allocates bandwidth to each active connection.

In some embodiments, the NAN further adapts to allocate a bandwidth for each alternate connection for ranging and/or signalling.

According to another broad aspect, the invention provides an AGN (aggregation node) comprising: a plurality of spatially switched antennas; a transceiver adapted to operate on the plurality of spatially switched antennas in a TDM fashion to establish active connections with other network nodes in a hierarchical manner; the AGN being adapted to perform a bi-directional relay function for backhaul traffic using at least one virtual circuit having an allocated bandwidth for delay sensitive traffic.

In some embodiments, the AGN in combination with an access network node of an access network.

In some embodiments, at least one virtual circuit terminates in the AGN for carrying traffic of the access network node.

In some embodiments, the AGN adapts to perform layer 2 switching on traffic on the at least one virtual circuit.

In some embodiments, the AGN adapts to schedule transmission on the spatially switched antennas in accordance with a resource assignment specifying for each of at least two connections and at least one of: time slots of communications, an encoding format, a signaling format, a modulated format and transmission power.

In some embodiments, the AGN adapts to dynamically allocate bandwidth to each of the active connections.

In some embodiments, the AGN further adapts to establish at least one alternate connection in addition to the active connections.

In some embodiments, the AGN further adapts to perform automatic path healing upon failure of an active connection or a node in the network, using the at least one alternate connection.

In some embodiments, the AGN further adapts to allocate a bandwidth at least for signalling and/or ranging for each alternate connection.

In some embodiments, the AGN further comprises a scheduler performing a scheduling operation to determine for each active connection and each alternate connection and at least one of: time slots of communications, an encoding format, a signaling format, a modulated format and transmission power.

In some embodiments, the AGN adapts to schedule time slots for ranging and signalling functions.

In some embodiments, upon at least one of power up, initialization and command, the AGN is adapted to perform a ranging function to identify another node with which the AGN can establish an active connection, and in an attempt to identify at least one alternate node with which the AGN can establish an alternate connection.

According to another broad aspect, the invention provides a BN (base node) for use at a bottom of a multi-hop wireless backhaul network, the BN comprising: a plurality of spatially switched antennas; a transceiver adapted to operate on the plurality of spatially switched antennas in a TDM fashion to establish an active connection with at least one other network node; the BN being adapted to be an end-point for at least one virtual circuit through the backhaul network having an allocated bandwidth for delay sensitive traffic.

In some embodiments, the BN in combination with an access network node of an access network, wherein at least one virtual circuit terminates in the BN for carrying traffic of the access network node.

In some embodiments, the BN adapts to schedule transmission on the spatially switched antennas in accordance with a resource assignment specifying for each active connection and at least one of: time slots of communications, an encoding format, a signaling format, a modulated format and transmission power.

In some embodiments, the BN further adapts to establish at least one alternate connection in addition to at least one active connection.

In some embodiments, the BN adapts to detect a failure on the at least one active connection, and to attempt to establish a traffic connection on the at least one alternate connection.

In some embodiments, the BN further comprises a scheduler performing a scheduling operation to determine for each active connection and for each alternate connection and at least one of: time slots of communications, an encoding format, a signaling format, a modulated format and transmission power.

In some embodiments, the BN adapts to schedule time slots for ranging and/or signalling functions to identify and/or maintain nodes with which connections can be established and is adapted to perform ranging and/or signalling during the time slots for ranging and signalling.

In some embodiments, upon at least one of power up, initialization and command, the BN is adapted to perform a ranging function to identify another node with which the BN establish an active connection, and in an attempt to identify at least one alternate node with which the BN can establish an alternate connection.

In some embodiments, a NAN, an AGN and/or a BN are each adapted to maintain an Ethernet bridging table containing for each of a first at least one address a respective egress wireless link identifier, and for each of a second at least one destination address a respective egress wireline link identifier, and to perform switching of packets using the Ethernet bridging table.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

DETAILED DESCRIPTION OF THE PREFERRED EMBODIMENTS

Figure 1:
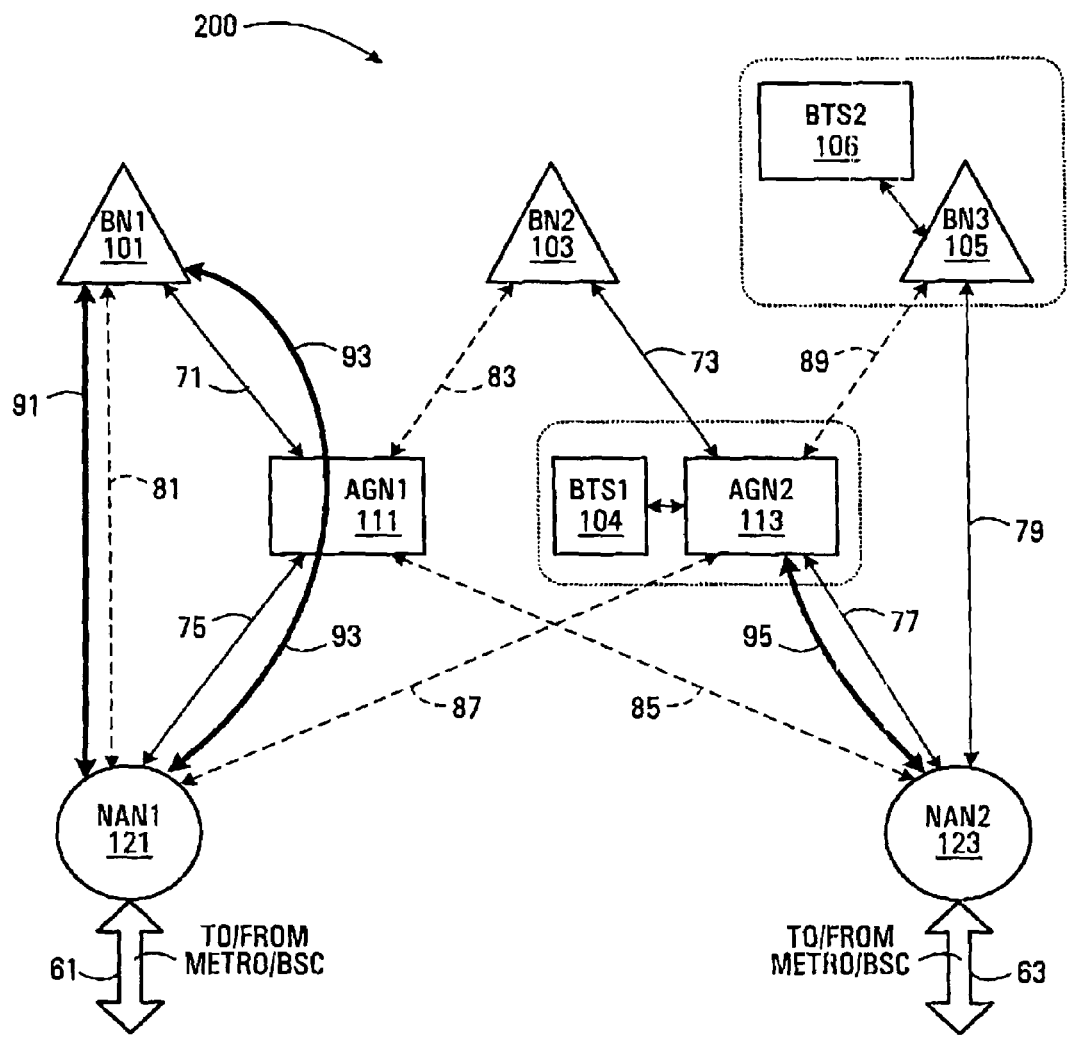
FIG. 1 is a block diagram of an example of a multi-hop wireless backhaul network provided by an embodiment of the invention.

Conventional multi-hop wireless networks have typically been created for low-capacity, delay tolerant, short-haul data transport to/from consumer electronics and Local Area Network (LAN) and Wide Area Network (WAN) operations. As such, known multi-hop wireless network standards include a number of characteristics which prevent the use of such multi-hop wireless networks in backhaul network design carrying delay sensitive circuit switched traffic.

For example, conventional multi-hop wireless networks are based on data packet routing. Consequently, each node in a multi-hop wireless network is effectively a router that parses each data packet it receives to determine the data packet's ultimate destination and then re-transmits the data packet as required. The routing functionality requirement alone makes each node relatively complex. Each node in a data packet's path delays the arrival time of the data packet to its ultimate destination, since each node parses the data packet before it is re-transmitted. Such delays are tolerated because the data carried on conventional multi-hop wireless networks is expected to be delay tolerant. When considering the applicability to backhaul network design, such delays are not acceptable since circuit traffic is sensitive to timing.

Multi-Hop Wireless Backhaul Network

A first embodiment of the invention provides a multi-hop wireless backhaul network, which preferably has a high capacity.

The multi-hop wireless backhaul network is composed of a number of distinct types of network nodes which are hierarchically connectable. These different types of nodes are used to build emulated virtual circuits through the multi-hop wireless backhaul network, as described in detail below. These types of nodes consist of Network Access Nodes (NANs), Aggregation Nodes (AGNs) and Base Nodes (BNs).

In its simplest sense, a NAN is the highest network node in the hierarchy. A NAN has functionality beyond this which is included in some embodiments. For example, in some embodiments, each NAN connects the multi-hop wireless backhaul network to another network, for example a metro network. Each NAN can form wireless connections to multiple BNs and/or AGNs. There may be one or multiple NANs in the multi-hop wireless backhaul network. Because the NAN is at the top of the hierarchy, it is a wireless end-point for any virtual circuits. The NAN may or may not be a circuit end point for a given virtual circuit.

More specifically, in some embodiments, each NAN is a circuit emulation endpoint for virtual circuits formed within the multi-hop wireless backhaul network. For example, in embodiments in which the metro network is a circuit switching network, for example a TDM based network, the NAN behaves as a circuit emulation endpoint, and has virtual circuit termination capabilities built in.

In some embodiments, a given NAN does not behave as a circuit endpoint for virtual circuits formed within the multi-hop wireless backhaul network, but instead incoming wireless traffic out a wireline port and vice versa on virtual circuits which pass through the NAN. For example, in embodiments in which the metro network is a packet switching network, for example an Ethernet based network, the virtual circuits have one circuit end-point point within the multi-hop wireless backhaul network, and a second circuit end-point outside the multi-hop wireless backhaul network.

In its simplest sense, an AGN is an intermediate network node in the hierarchy. One or more AGNs can be interposed between a BN and a NAN. The closer, in terms of hops to a NAN, an AGN is the higher in the hierarchy of the multi-hop wireless backhaul network it is considered to be. The AGNs generally serve to aggregate and relay/amplify circuit traffic between network nodes in the up stream (BN/AGN towards NAN) and down stream (NAN towards BN/AGN) directions.

In a system limited to a maximum of two hops, each AGN connects one or more BNs to a NAN. In the event a larger number of hops are permitted, an AGN connects one or more BNs or AGNs below it in the hierarchy to one or more AGNs or NANs above it in the hierarchy. An AGN is not a circuit endpoint for circuit traffic that it is relaying on a circuit between a NAN and a BN/AGN or for traffic that it is aggregating from multiple BNs/AGNs to a NAN. That is, if an AGN is interposed within a circuit between two other nodes (e.g. a NAN and a BN or another AGN), it is preferable that the AGN simply switch the circuit traffic between the end-nodes of the circuit.

The AGNs can add (i.e. aggregate) additional traffic in the up-stream direction and drop traffic from in the down-stream direction. AGNs interposed between two network nodes inherently increase circuit lengths, which can be advantageous for emulating long circuits and delivering circuit traffic to between circuit end-points that are far away from one another (e.g. a NAN and a distant BN).

In its simplest sense, a BN is a network node that is the lowest network node in the hierarchy. Preferably, a BN serves as a circuit emulation end-point. BNs are typically located at the periphery of the multi-hop wireless backhaul network.

In operation, wireless connections between the various network node types are established in a hierarchical manner from each BN to a NAN. This implies that each BN is connected to an AGN or a NAN directly, and each AGN is also ultimately connected to a NAN; possibly through another AGN. As indicated above, in some embodiments, multiple AGN hops are implemented and in such cases an AGN may be connected to another AGN. In typical implementations, the distances between network nodes and available bandwidth will serve to limit the number of traffic carrying links any one network node can establish.

For systems featuring multiple AGN hops to connect a BN to a NAN, the AGNs are also hierarchically arranged such that a given AGN is only connectable to AGNs above it and AGNs below it in the hierarchy. There is no ambiguity as to whether an AGN is upstream or downstream of another AGN because the hierarchical connectivity precludes an AGN being both upstream (for one traffic flow) and downstream (for another flow) of another AGN.

There are not any BN→BN traffic connections nor are there any NAN→NAN traffic connections.

It is noted that in some embodiments, network nodes may communicate using service and maintenance channels to exchange Operation and Management (OAM) information with one another, which is different from backhaul data traffic. The strict hierarchical topology does not necessarily need to be enforced for such communications.

Bandwidth is allocated hierarchically with network nodes higher in the hierarchy providing capacity to serve all connections for nodes lower in the hierarchy that depend on network nodes higher in the hierarchy. The NAN downstream bandwidth of each NAN is divided between any AGNs and/or BNs to which it is connected. Multiple different NANs, in some instances, can provide bandwidth to the same set of AGNs and BNs. Similarly, the downstream bandwidth of each AGN is divided between any AGNs and/or BNs to which it is connected. In some embodiments, this bandwidth allocation is done dynamically by each NAN and each AGN. In such an embodiment, each NAN dynamically allocates its downstream bandwidth between its dependent AGNs and/or BNs, and similarly each AGN dynamically allocates its bandwidth between its dependent BNs and/or AGNs. An example of such an implementation is described in further detail below.

Each AGN is responsible for dynamic bandwidth partitioning and priority scheduling in order to provide communication links (paths) for network nodes dependent on it (e.g. BNs or other AGNs). AGNs that have multiple dependent network nodes aggregate traffic from these network nodes onto at least one up-stream link.

In a preferred embodiment, the entire multi-hop wireless backhaul network is "overlaid" over an access network, for example a cellular wireless access network. In such an embodiment, the multi-hop wireless backhaul network provides backhaul connectivity for the access network. In such an embodiment, each BN is co-located with and connected to or integrated with a respective access network node of the cellular wireless access network, a cellular base-station transceiver for example. Virtual circuits are established from each BN to or through a NAN to transport traffic for the respective access network node(s). Each BN is involved in circuit emulation for traffic entering and leaving the multi-hop wireless backhaul network through the access network node(s).

In some embodiments, one or more AGNs may also be co-located or connected to a respective access network node (s) of the access network, such as a cellular base-station transceiver. Such AGNs also serve as circuit end-points. Such AGNs are involved in circuit emulation for traffic entering and leaving the multi-hop wireless backhaul network through the access network nodes.

In some embodiments, a particular node may have two or more nodes connected above itself in the hierarchy. In such instances, each of the two or more nodes may each provide a portion of the total bandwidth allocated to the particular node. Each node that provides bandwidth to the particular node is considered an active node.

Referring now to FIG. 1, shown is a block diagram of an example of a multi-hop wireless backhaul network, generally indicated by 200, provided by an embodiment of the invention. The multi-hop wireless backhaul network 200 is made-up of a number of Base Nodes (BNs) BN1 101, BN2 103, BN3 105, Aggregation Nodes (AGNs) AGN1 111, AGN2 113 and Network Access Nodes (NANs) NAN1 121, NAN2 123, where "BN1", "BN2", etc. are identifiers of the network nodes within the multi-hop wireless backhaul network. Together the BNs, the AGNs and the NANs are the constituent network nodes for multi-hop wireless backhaul network 200. Although a specific number and arrangement of BNs, AGNs and NANs are shown, it is to be understood that more generally any appropriate number of each type of node, appropriately arranged, could be present within a single multi-hop wireless backhaul system.

As discussed above, some of the constituent network nodes may be co-located and connect to or integrated with access network nodes. With further reference to FIG. 1, as an example, BN3 105 is shown to be co-located with base-station transceiver BTS2 106. Similarly, AGN2 113 is shown to be co-located with a BTS1 104.

It was also discussed above that NANs are used to connect the multi-hop wireless backhaul network to another network or networks. With further reference to FIG. 1, NAN1 121 and NAN2 123 are shown to have core network connections 61 and 63, respectively. These connections in the illustrated example are to a metro network.

In a preferred embodiment, the NANs are connected directly or indirectly to network element(s) (such as a BSC/RNC) responsible for managing the underlying access network and/or to network element(s) responsible for managing the multi-hop wireless backhaul network.

The constituent network nodes that make-up the multi-hop wireless backhaul network 200 shown in FIG. 1 set up backhaul connections according to the hierarchical topology described previously.

The specific traffic carrying links (a link is the same as a connection) shown in FIG. 1 will now be described in detail. Active links are shown in FIG. 1 using solid lines. Circuits are shown in FIG. 1 using bold solid lines. Alternate links are shown in FIG. 1 using dashed lines. The alternate links will be described in detail below together with the path healing embodiment.

BN1 101 has an active link 71 to the AGN1 111. BN2 103 has an active link 73 to the AGN2 113. BN3 105 has an active link 79 to the NAN2 123. AGN1 111 has an active link 75 to the NAN1 121. AGN2 113 has an active link 77 to the NAN2 123. The active links 71,73,75,77,79 are used to carry circuit traffic to and from the respective network nodes they are associated with.

One specific example set of alternate links is also shown in FIG. 1. The BN1 101 is shown to have an alternate link 81 to the NAN1 121. The BN2 103 has an alternate link 83 to the AGN1 111. The BN3 105 has an alternate link 89 to the AGN2 113. The AGN1 111 has an alternate link 85 to the NAN2 123. The AGN2 113 has an alternate link 87 to the NAN1 121. The alternate links 81,83,85,87,89 will be described in detail below together with an embodiment that also includes a method for full/partial path-healing.

Using the active links 71,73,75,77,79 circuits between pairs of constituent network nodes can be emulated. This means that dedicated virtual channels, within the active links 71,73,75,77,79, are set-up to carry traffic between the circuit end-nodes. For example, as shown in FIG. 1, a first circuit 95 is shown between circuit end-nodes AGN2 113 and NAN2 123. Circuit traffic can be sent up-stream from the AGN2 113 to the NAN2 123, and, down-stream from the NAN2 123 to the AGN2 113 co-located with the BTS1 104. Other network nodes (e.g. BN2 103, BN3 105, AGN1 111, and NAN1 121) that have active or alternate links with either AGN2 113 or NAN2 123 cannot infringe upon the bandwidth allocated for the dedicated virtual channel set up on active link 77 used in the emulation of circuit 95 during normal operation.

In another example, a circuit 93 is shown between circuit end-nodes BN1 101 and NAN1 121. In this example, the circuit 93 requires that dedicated virtual channels be set-up on active links 71 and 75, each of which has the AGN1 111 as an end-node. The dedicated virtual channels within the active links 71 and 75 provide enough bandwidth to support the circuit traffic between the BN1 101 and the NAN1 121. With respect to the circuit 93, the AGN1 111 serves to relay/switch circuit traffic carried through the circuit 93. The AGN1 111 is not used in the emulation of the circuit 93, and preferably only acts as a relay/switching node for circuit 93. The AGN1 111 may simultaneously act as and add/drop node for forwarding/adding backhaul traffic upstream originating from a co-located base-station (not shown) and dropping/delivering backhaul traffic to the co-located base-station from the NAN1 121.

As will be discussed in more detail further below, in order to enable the path-healing method, a given network node preferably maintains at least separate links above itself in the hierarchy. An active link with at least one of the two nodes hierarchically above is established and maintained. An active link may also be maintained to the second node in which case traffic up the hierarchy from the given node can be divided between the two nodes above. Alternatively, the second node can be an "alternate" node meaning that in nominal conditions, traffic is not sent to the second node. Connectivity with the alternate node is maintained on a "keep alive" basis to enable rapid re-configuration if the active node fails. The path healing method will be discussed in detail below.

Topology Management

In a preferred embodiment, at least some of the management of the interconnection between network nodes in a multi-hop wireless backhaul network is distributed to the network nodes themselves. This will be referred to as Topology Management or TM functionality that is provided on each NAN, AGN and BN. The TM functionality may be provided in the form of a suitable combination of at least one of software, hardware and firmware residing in each network node.

In some embodiments topology information is maintained at each constituent network node, for example by the above described topology management functionality. In some embodiments, each network node keeps a record of the entire multi-hop backhaul network's connectivity, but at a minimum, the topology information contains an up-to-date record of a network node's local connectivity. This hierarchical topology information may be maintained in any suitable form by each network node. In an example implementation, the hierarchical topology information is stored in a topology table that maintains a hierarchical view of other nearby network nodes.

Figure 2A:
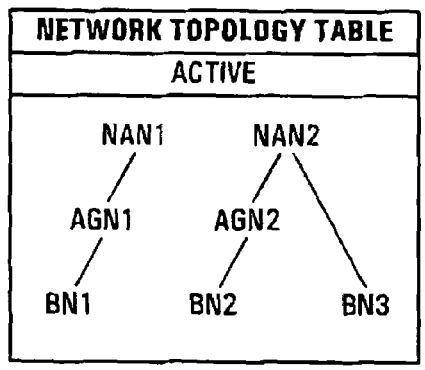
FIGS. 2A, 2B, 2C and 2D are topology tables for the entire network, a Base Node (BN), an Aggregation Node (AGN) and an Network Access Node (NAN) shown in FIG. 1, respectively, in accordance with an embodiment of the invention.

Shown in FIG. 2A is a topology table containing an entire hierarchical topology view for the active links shown in the example provided in FIG. 1 that could be maintained at a Network Topology Manager. In some embodiments this type of hierarchical system view is also maintained within each network node.

Figure 2C:
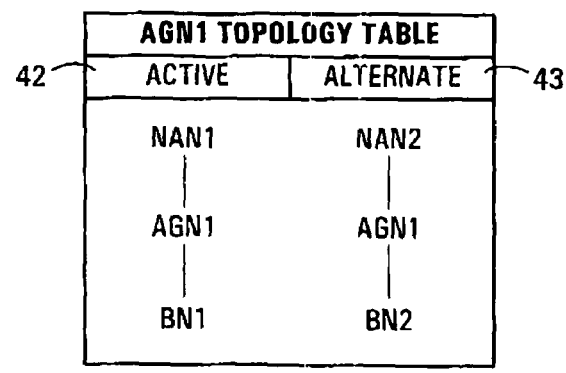
Figure 2B:
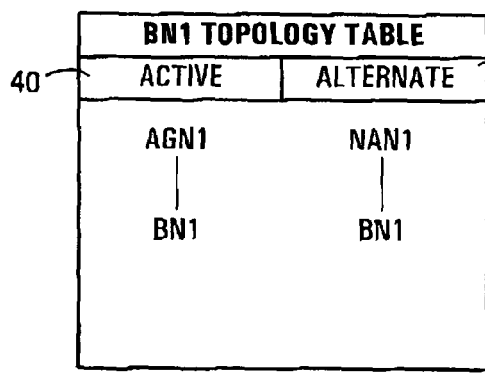
Figure 2D:
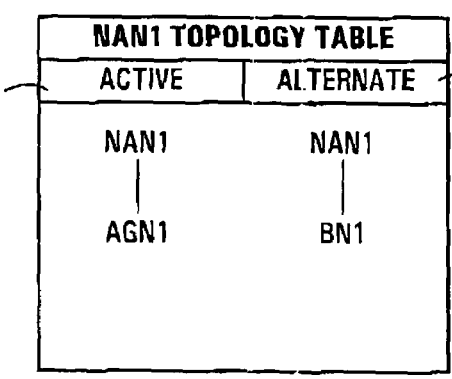

Alternatively, the minimum required by each node may be maintained as shown in FIGS. 2B, 2C and 2D which are example minimum active link topology information 40,42,44 for the BN1 101, the AGN1 111 and the NAN1 121, respectively, which are provided and maintained within the BN1 101, the AGN1 111 and the NAN1 121, respectively. As described above, each topology table maintains a hierarchical view of the multi-hop wireless backhaul network 200 from the perspective of the constituent network node on which the topology table resides. Also shown are alternate link topologies 41,43,45 used in embodiments featuring path healing as described in detail below.

Element Management System

In some embodiments an additional network management function is provided in the form of an Element Management System (EMS). The EMS may be implemented as a hardware/software component on a NAN in the multi-hop wireless backhaul network. Preferably, the EMS resides on a an element external to the BNs, AGNs and NANs of the multi-hop wireless backhaul network, for example on a NAN, a Network Topology Manager or Access Network Controller responsible for managing an underlying access network.

In some embodiments, the EMS is maintained in a centralized location, since such a location typically also houses logic (hardware, software, firmware, etc.) for high-level control functions for an entire multi-hop wireless backhaul network. Such a central location is also where backhaul traffic typically terminates into other communication systems, such as voice networks in PSTN systems.

In an alternative embodiment, the EMS is located away from a multi-hop wireless backhaul network but connected to the highest levels of the hierarchy in the multi-hop wireless backhaul network. In such an embodiment, the EMS still stores and maintains an up-to-date record of relevant network node connections and circuits in uses within the multi-hop wireless backhaul network, similar to the topology table shown in FIG. 2A.

The EMS can also be used for path reconfiguration. Path reconfiguration might be performed to deal with long-term load balancing or to replace failed node/links. The EMS is typically also responsible for high-level OA&M in the multi-hop wireless backhaul network, macroscopic radio resource management, interfacing to and configuration with core network nodes (e.g. BSC, RNA, metro connections, etc.), protection configuration, fault and alarm management, performance management and configuration management.

Figure 3:
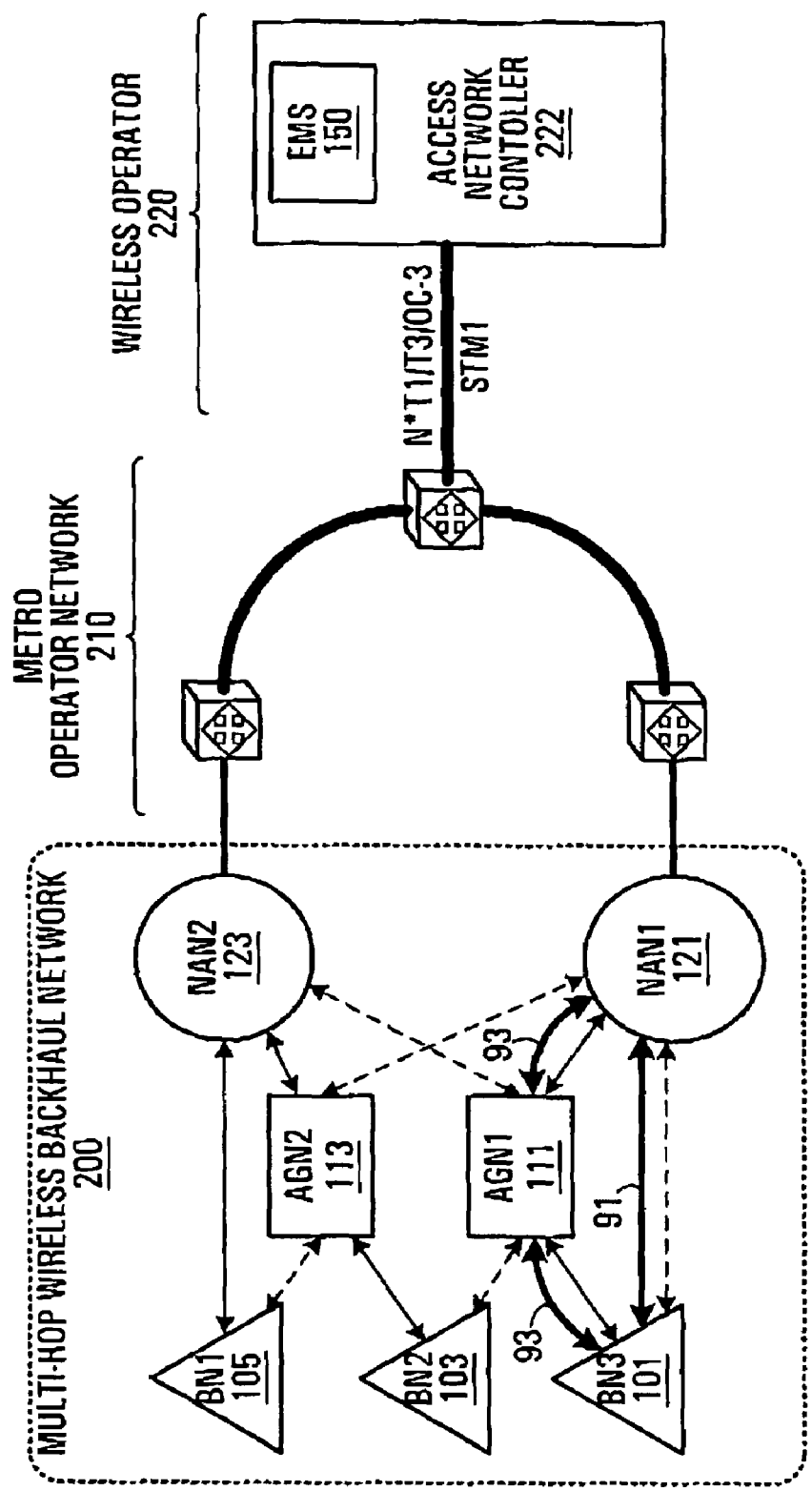
FIG. 3 is a block diagram of a communication system, including the multi-hop wireless backhaul network of FIG. 1, provided by another embodiment of the invention.

Shown in FIG. 3 is an example of where and how the EMS might be located and configured in regard to the multi-hop wireless backhaul network 200 described previously with respect to FIG. 1. The NAN1 121 and the NAN2 123 of the multi-hop wireless backhaul network 200 are connected to a metro operator network 210 which is in turn connected to an access network controller 222 which also contains the EMS 150. The access network controller 222 performs control functions in respect of the underlying access network for which backhaul transport is being provided by the multi-hop wireless backhaul network. If the underlying access network is a cellular access network, the access network controller might be a Base-Station Controller/Radio Network Controller (BNC/RNC) 222, which belongs to a wireless operator 220.

In the example of FIG. 3, the control function for the underlying access network is co-located with the high-level management function EMS for the multi-hop wireless backhaul network. In other embodiments, the EMS may be separately located.

A communication network to which a multi-hop wireless backhaul network is connected to provides network access to various pre-determined amounts of bandwidth. In the example of FIG. 3, the communication network providing this bandwidth is a metro network 210, but other types of networks may alternatively be employed. In some embodiments the predetermined amounts of bandwidth can range from fractional amounts of a T1 link, to multiple T1 links. In other embodiments the predetermined amounts of bandwidth can provided through at least one of OC-3 and STM1 types of links. The bandwidth is first distributed among the NANs of a multi-hop wireless backhaul network. The NANs in turn dynamically allocate the bandwidth among AGNs and BNs dependent upon them.

In the example of FIG. 3, the communications network is a metro network. This might for example implement a traditional circuit switched function, Ethernet private line or Ethernet virtual private line. In a preferred embodiment, Native Ethernet is employed on the multi-hop wireless backhaul network and the communications network to which it is connected. This would allow backhaul traffic to pass through as being natively Ethernet ready.

Spatially Switched Antennas

In some embodiments, the network nodes like the AGNs and the BNs described above have spatially switched antennas. Each such network node has an antenna arrangement allowing transmission on a plurality of antenna beams that are each oriented in a different direction. Any appropriate multi-beam configuration may be employed. These beams may be adaptively defined, statically defined, they may be statically shaped beams which are individually steerable, or formed by a beam steering array in which a fixed set of beams can be steered collectively to one of several discrete orientations.

In a specific embodiment, each network node is implemented with a single switched transceiver design that employs Time Division Multiplexing (TDM) to cycle through a number of spatially switched antennas at one network node. In such embodiments, a single NLOS radio unit is required within each constituent network node, and this single radio unit enables dynamic bandwidth allocation at each constituent network node.

Figure 4:
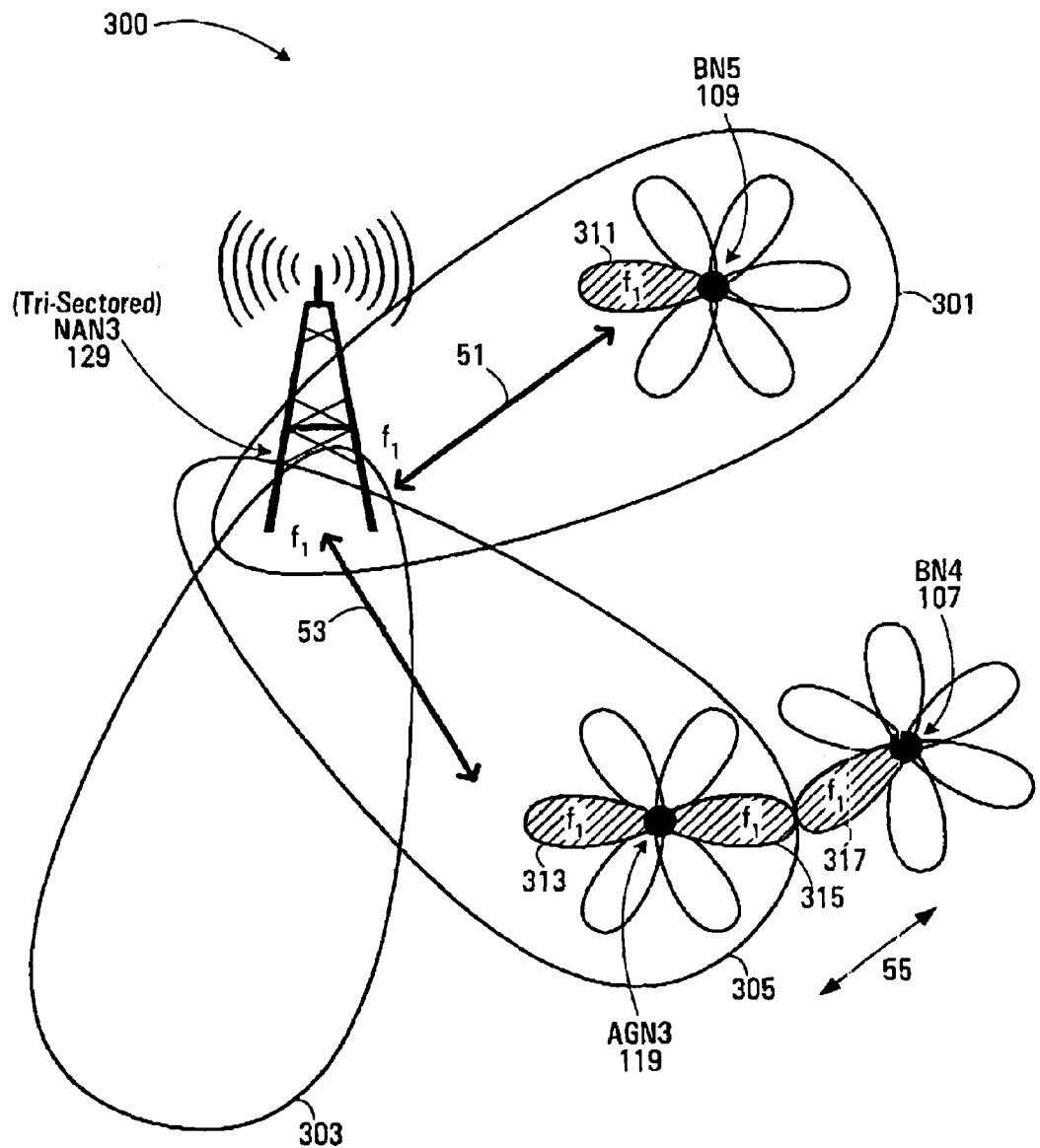
FIG. 4 is a block diagram of an example of a multi-hop wireless backhaul network provided by an embodiment of the invention that illustrates examples of spatially switched antenna beam patterns for a number of constituent network nodes.

The diagram provided in FIG. 4 shows a very specific example of a multi-hop wireless backhaul network, generally indicated by 300, for the purpose of illustrating how spatially switched antenna beam patterns can be employed in each of the constituent network nodes. The multi-hop wireless backhaul network 300 is made up of a NAN3 129, an AGN3 119, and BN4 107 and BN5 109. Again, although a specific number and arrangement of BNs, AGNs and NANs are shown, it is to be understood that more generally any appropriate number of each type of node, appropriately arranged, could be employed.

The NAN3 129 has a fixed connection (not shown) to an external network (not shown) through which network access to the multi-hop wireless backhaul network 300 is provided. The NAN 129 has three antenna beams 301,303,305, which are constantly active (in this example), that project away from the NAN 129 in order to transmit and receive signals from the area around the NAN 129.

The NAN 129 has multiple radios, for example, three that are connected to antennas that project antenna beams 301, 303,305 on carrier frequency $f_1$. The antenna beams 301,303, 305 are appropriately chosen and configured to minimize interference between signals transmitted/received on each with respect to one another.

The AGN3 119, the BN4 107 and BN5 109 each project six spatially switched antenna beam patterns away from their location using a single radio (per node). As for the NAN3 129, the AGN3 119, the BN4 107 and the BN5 109 also transmit and receive on the carrier frequency $f_1$ in a TDM manner. Thus, only one of the six spatially switched antenna beam patterns for each of the AGN3 119, the BN4 107 and BN5 109 is active at one time.

The BN5 109 is shown to have an active spatially switched antenna beam (lobe) 311 that overlaps the antenna beam 301 of the NAN3 129. When spatially switched antenna beams 311 and antenna beam 301 are both simultaneously active, backhaul link 51 is active, which means that backhaul traffic can flow between the BN5 109 and the NAN3 129 in the up and down-stream directions.

Similarly, the AGN3 119 is shown to have active spatially switched antenna beams (lobes) 313 and 315. It is to be understood that if TDM is employed, the spatially switched antenna beams 313 and 315 would not be active simultaneously. The AGN3 119 uses spatially switched antenna beam 313 to establish backhaul link 53 to the NAN3 129 when both spatially switched antenna beam 313 and antenna beam 305 are active simultaneously. As for backhaul link 51, backhaul link 53 is used to transmit and receive backhaul traffic to and from the NAN3 129.

The BN4 107 is shown to have an active spatially switched antenna beam 317. The BN4 107 is also shown to be outside the antenna beam patterns 301,303,305 of the NAN3 129. As such, the BN4 107 uses the AGN3 119 as a relay node to connect to the NAN3 129. When spatially switched antenna beam patterns 315 and 317 are simultaneously active, backhaul link 55 is established between the AGN3 119 and the BN4 107.

For the example shown in FIG. 4, each of the network nodes (i.e. the AGN3 119, the BN4 107 and the BN5 109) synchronize the manner in which they cycle through their respective spatially switched antenna beams. This synchronization is done so that the backhaul circuit links 51, 53 and 55 can effectively and efficiently be used to transport backhaul traffic around multi-hop wireless backhaul network 300.

Circuit Emulation

In some embodiments, each circuit emulated within the multi-hop wireless backhaul network terminates at a NAN. The NAN then ships the traffic to another communication network and/or an access network controller. This embodiment is appropriate where the communications network is a circuit switched network, for example a TDM based network.

A system/mechanism is in place to enable the other communication network and/or access network controller to ascertain from where the traffic originated and to know where in the multi-hop wireless backhaul network to send traffic in the downlink direction. Any appropriate system/mechanism can be used, and many such system/mechanisms are well known. In general, any of the approaches that have been used in the past for non-wireless backhaul networks can be adapted for use in a multi-hop wireless backhaul network provided by an embodiment of the invention.

For example, in some embodiments, there is a dedicated high-capacity data channel (physical or virtual) for each emulated circuit from the terminating NAN to another communication network and/or access network controller, for example a T1, or multiple T1s. This might be TDM or Packet over SONET/SDH ring for example. Then, by transmitting the traffic received at a given NAN on the appropriate dedicated high capacity date channel, the another communication network and/or access network controller is able to distinguish where the traffic came from without the need for additional labels or tags. In the downlink direction, traffic sent by the another communication network and/or access network controller into the multi-hop wireless backhaul network is addressed to a particular access network node connected to or integrated with a network node of the multi-hop wireless backhaul network. Once again, a dedicated high-capacity data channel can be established for the traffic of a given access network node. The high-capacity data channel links the another communication network and/or access network controller through to the appropriate NAN, which is then forwards the traffic on an appropriate virtual circuit to the appropriate network node.

In some instances, backhaul circuit emulation requires the definition of multi-hop circuits in which intermediary network nodes (e.g. AGNs) are placed between two respective circuit end-nodes to relay/amplify circuit traffic in the up and down stream directions. These embodiments include add/drop aggregation and/or relaying functions for multi-hop operation incorporated into a single switched transceiver design including a number of spatially switched antennas, which was described above.

In another embodiment, the virtual circuits do not terminate in the NAN, but rather terminate outside the wireless multi-hop backhaul network. This approach is appropriate for applications where there is a packet based metro network for example. As an example, referring to FIG. 3, if the metro operator network 210 is a packet based network, a first virtual circuit can be established from BN1 105 through the multi-hop wireless backhaul network 200, and through the metro operator network 210 all the way to the access network controller 222. This eliminates a significant amount of hardware in the NAN if circuit emulation termination does not need to be performed there. In one embodiment, Ethernet is used as the packet protocol on both the multi-hop wireless backhaul network and the metro operator network. In such embodiments, capacity on the metro operator network 210 might be leased Ethernet-based capacity implementing a virtual private LAN. Protection switching which might occur for the virtual circuits outside the multi-hop wireless backhaul network can be performed using conventional means and is outside the scope of this invention.

As an example of how Layer 2 switching might be performed for the Ethernet example, an Ethernet bridging table may be maintained in each BN, AGN, and NAN. Ethernet bridging tables are well known. However, in this example, the bridging tables have two different types of entries, one being for wireless links, and the other type being for wireline links.

Table 1 below is an example of an Ethernet bridging table for application in a BN, AGN or NAN. The bridging table has a column for a destination address of each circuit being emulated, for example a MAC address. In the Ethernet implementation, this might be an Ethernet address. The second column contains an egress wireless link identifier, and the third column contains an egress wireline link identifier. For a given circuit emulated packet flow in a given node, it will have only one of the wireline link identifier and the wireless link identifier. The wireless link identifier is any identifier allowing the packet to be switched locally out the correct wireless link and time slot. It might be a port identifier for example. In some implementations, wireless ports and time slots may have associated link identifiers. Similarly, the wireline link identifier is any identifier allowing the packet to be switched locally out the required wireline link. For the NAN, the wireline link will be towards the external network. For the AGN or BN, a wireline link would be provided to the locally connected/integrated access network node. This might be a link identifier representation of a T1 port for example in a BN (or an OC-3 port at an AGN). Layer 2 switching is performed by performing table lookup upon receipt of a packet at the node.

TABLE 1

Ethernet Bridging Table Example

| Destination Address (MAC address) | Egress Wireless Link Identifier | Egress Wireline Link Identifier |
|---|---|---|
| e.g. Ethernet address or radio MAC address | wireless port (representation of port and time slot) | wireline port (representation of circuit port ID) |

Figure 10:
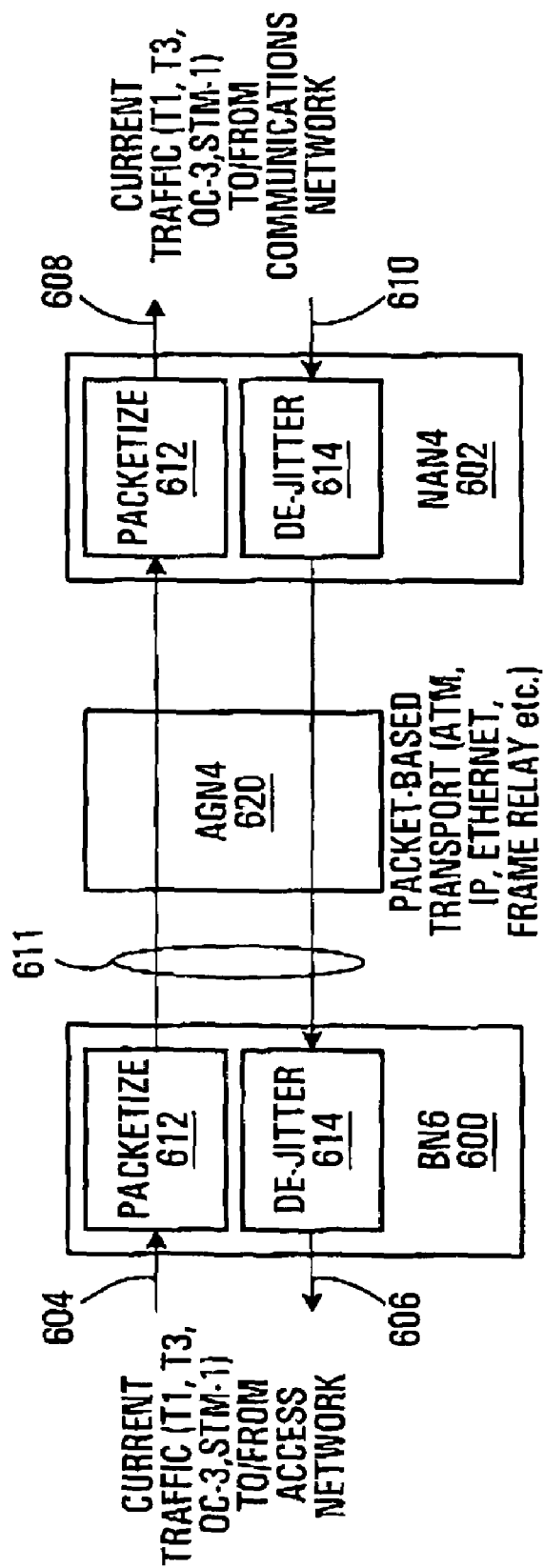
FIG. 10 is a block diagram showing an example of how circuit emulation within the multi-hop wireless backhaul network can be performed.

Another example of circuit emulation is shown in FIG. 10. A given circuit will have two network nodes serving endpoints. In the example, the endpoints of virtual circuit 611 are BN6 600 and NAN4 602, and the virtual circuit also passes through AGN4 620. The BN6 600 delivers traffic 606 and receives traffic 604 from an access network (not shown). The traffic can be in any suitable delay sensitive form, for example but not limited to T1, T3, OC-3, STM-1. Similarly, NAN4 602 delivers traffic 608 to and receives traffic 610 from a communications network to which the NAN4 602 is connected (not shown). Again, this traffic can be in any suitable delay sensitive form. The BN6 600 performs packetization 612 of incoming frames into a packet format for transmission over the multi-hop wireless backhaul network over the circuit 611. This can be any suitable connection oriented packet based transport, for example but not limited to ATM (asynchronous transport mode), a connection oriented IP (internet protocol), Ethernet, Frame Relay, etc. The BN6 600 also performs de-jittering 614 for traffic received from the multi-hop wireless backhaul on circuit 611. Similarly, NAN4 602 performs a de-jittering operation 616 for traffic it receives from BN4 600 over the circuit 611 via the multi-hop wireless backhaul, and performs packetization 618 for traffic received from the communications network for transport over the circuit 611.

Some, but not necessarily all emulated circuits will have one or more (preferably at most one) intermediate nodes, referred to as AGNs above. The example of FIG. 10 shows a single AGN 620. The AGN 620 operates in the domain of the switched packet based transport used on the multi-hop wireless backhaul network. For intermediate nodes, packets received from network nodes hierarchically below are simply forwarded on upwards in the hierarchy. Similarly, packets received from network nodes hierarchically above are forwarded on below in the hierarchy.

In the illustrated example, packets received by AGN4 620 from the BN6 600 are simply forwarded on towards the NAN4 602. Similarly, packets received by the AGN4 620 from the NAN4 602 are simply forwarded on towards the BN6 600.

If the AGN4 620 supports multiple nodes below, then the AGN4 620 performs an aggregation function of all traffic received, and forwards this on to the active node above. Similarly, the AGN4 620 performs a de-aggregation/dropping function to divide traffic received from above to be transmitted on the appropriate link below. Preferably, the AGN4 620 performs switching at layer two, for example Ethernet layer two switching.

Physical Layer

Figure 11:
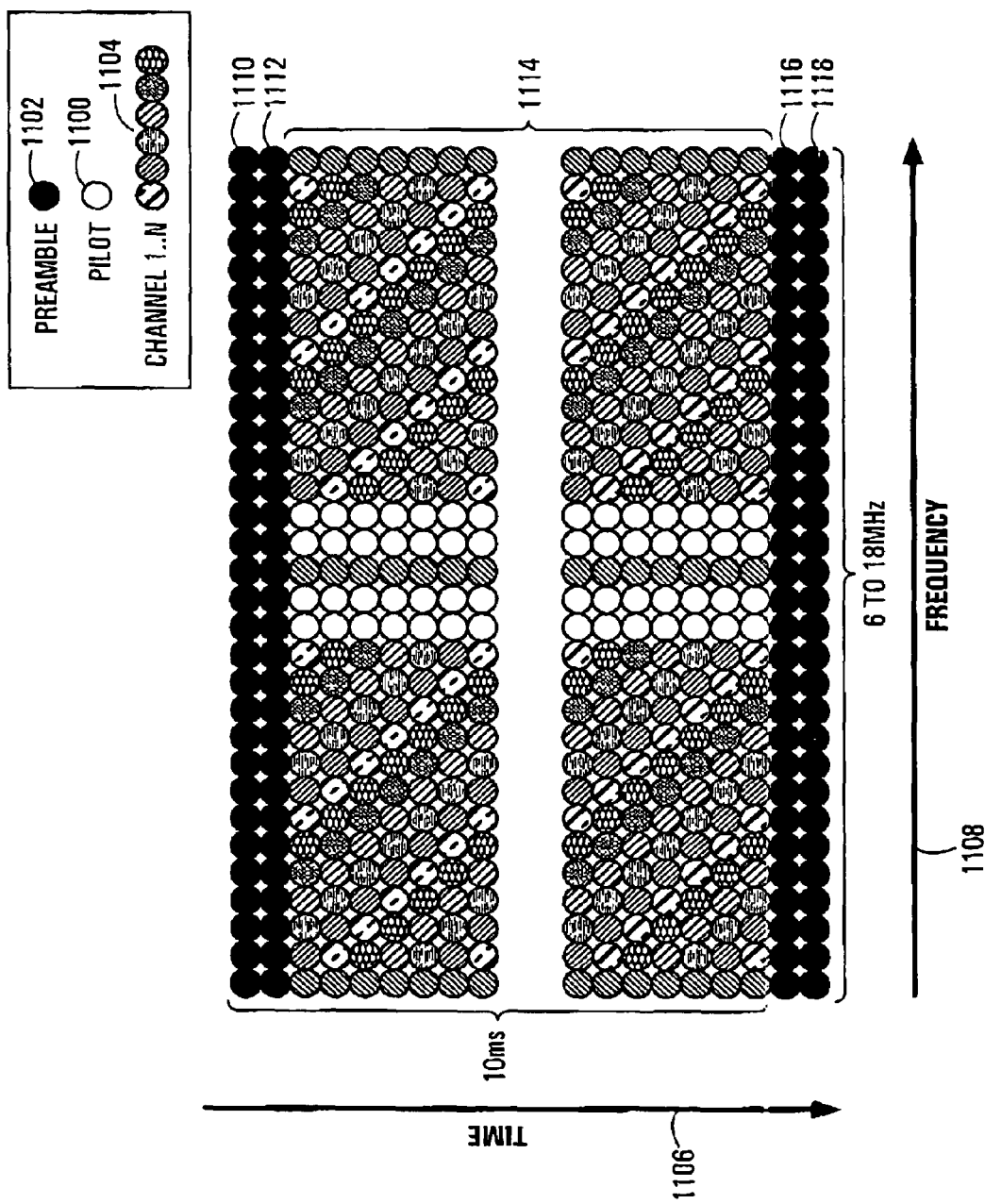
FIG. 11 is a diagram of an example physical layer structure based on MIMO OFDMA.

In a preferred embodiment, MIMO (Multiple Input Multiple Output) OFDMA (Orthogonal Frequency Division Multiplexing Access) is employed for the physical layer in the multi-hop wireless backhaul network. One specific example of a physical layer structure based on MIMO OFDMA is shown in FIG. 11. The structure shows a 10 ms frame with time measured on the vertical axis 1106, and frequency measured on the horizontal axis 1108. The frame consists of a series of OFDM symbols each containing a set of OFDM subcarriers, collectively occupying 10 ms. The first two symbols 1110,1112 are shown to contain only preamble 1102 content. This is followed (in time) by a series of OFDM symbols 1114 that consist of channel data and pilot symbols 1100. In the illustrated example, a defined layout of subcarriers, and OFDM symbols together defines a set of channels 1 to N 1104. The frame ends with two more symbols 1116,1118 containing more preamble content 1102.

A BN transmitting and receiving such a structure synchronizes to either a NAN or AGN hierarchically above itself based on the preamble for initial system access. Preferably, low overhead pilots are used for phase tracking and channel tracking, and in some embodiments these are designed to support MIMO as described in further detail below with reference to FIG. 12. This combination of FDM/TDM allows matching of T1 traffic flow with minimum queuing delay. The physical layer selects the appropriate modulation and coding format based on channel conditions. Thus a single T1 link may require different bandwidth allocations/assignments depending upon the channel conditions.

A very specific example of a physical layer structure has been provided. Other MIMO OFDMA structures may alternatively be employed, or other structures which are not based on MIMO OFDMA may be employed for the physical layer.

Figure 12:
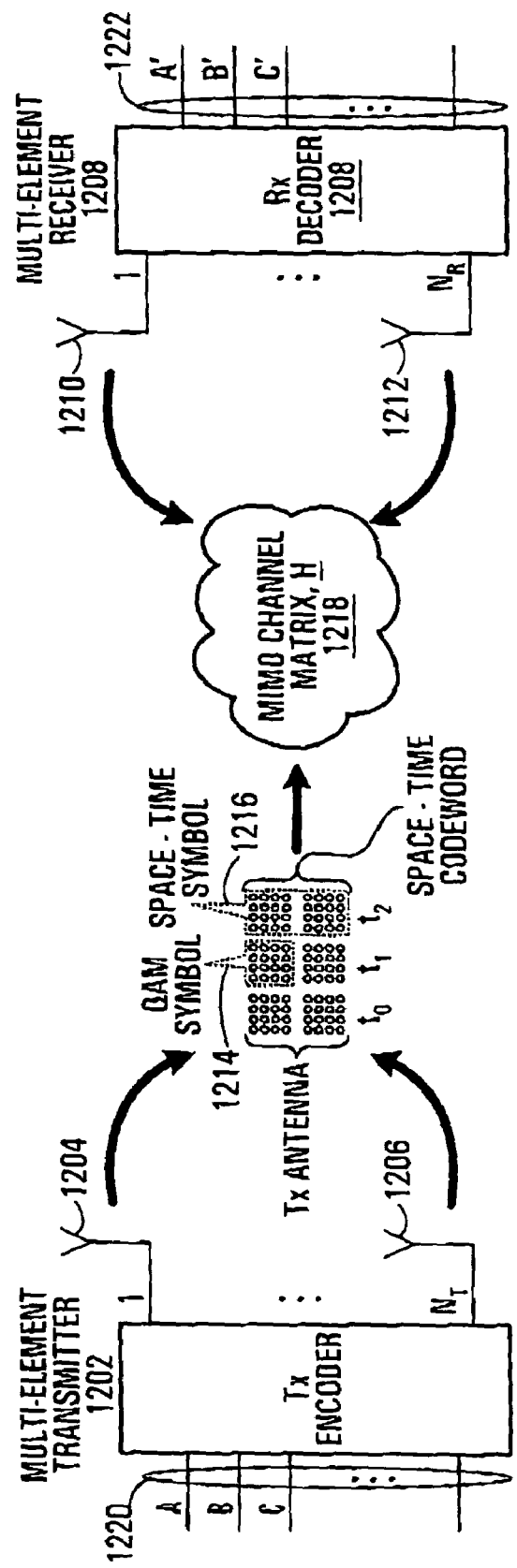
FIG. 12 is a system diagram of an example of spatial antenna processing using MIMO.

Referring now to FIG. 12, shown is an example of spatial antenna processing employing MIMO, preferably employed in a multi-hop wireless backhaul network. Shown is a multi-element transmitter 1202 and a multi-element receiver 1208. The multi-element transmitter 1202 has a set of 1 to $N_T$ transmit antennas 1204,1206. Preferably, these are spatially oriented in sets of pairs of dual polarizations. Single antennas may alternatively have dual polarization capability. For a given time slot, the multi-element transmitter 1202 transmits on one pair of antennas (or the single antenna). Quadrature Amplitude Modulation (QAM) symbols 1214 are transmitted on each antenna of the pair. Preferably, preferably space-time encoding is also employed to generate space-time symbols 1216 that contain respective content for transmission on each of the pair of antennas. The multi-element transmitter 1202 has downstream channels 1220. The capacity required for these channels is assigned to the MIMO OFDMA physical layer, for example as described previously with reference to FIG. 11.

The space time symbols 1216 thus generated are transmitted over the air and effected by the wireless channel having MIMO channel matrix H 1218, and are then received by 1 to $N_R$ antennas 1210,1212 of the multi-element receiver 1208 which performs MIMO decoding and extracts the channels 1222.

In a preferred embodiment, 18 MHz bandwidth is provided for the uplink and the downlink, and an uplink, downlink separation of 42 MHz is employed. Of course, other values can be employed. Preferably, the BNs and AGNs have directional switched 6-beam antennas, and MIMO is employed with polarization diversity. Preferably the NAN has a tri-sectored design, and MIMO with polarization diversity is again employed. The tri-sectored design for the NAN requires three transceiver chains whereas the BNs and AGNs can each be implemented with a single transceiver chain.

Dynamic Bandwidth Management

In a preferred embodiment, each constituent network node dynamically allocates network resources (e.g. bandwidth) to network nodes below and dependent on it in the hierarchy. More particularly, bandwidth is allocated to guarantee a minimum required bandwidth for dependent network nodes below, based on current traffic requirements. Any excess bandwidth available after allocating these minimum required bandwidths is then available to support delay tolerant traffic, subject to "best effort delays" if the excess bandwidth is required for delay sensitive traffic.

Each circuit supported in by a network node requires a respective allocation of bandwidth. The actual allocation of bandwidth is made after a determination of the required throughput for each circuit and the mapping is performed at the physical layer.

In some embodiments the result is that a multi-hop wireless backhaul network will support bandwidth-on-demand in which resources can be re-distributed to handle actual traffic requirements from the constituent network nodes. A multi-hop wireless backhaul network that uses dynamic bandwidth management as provided by embodiments of the present invention is capable of automatically adapting for/to increased transmission bandwidth in the air interfaces to accommodate for network growth.

With respect to the discussion of the physical layer above, the type of bandwidth that is allocated is determined on an implementation specific basis. In a preferred embodiment, the air interface uses OFDM (Orthogonal Frequency Division Multiplexing), and the bandwidth allocations comprise an appropriate allocation of OFDM sub-carriers, time slots, modulation and coding sets. In other embodiments, the air interface uses CDMA-based signals, and the bandwidth allocations comprise a spreading code or a set of spreading codes. Other air interfaces may alternatively be employed, given that they accommodate the data rates sought.

Bandwidth is allocated at the NAN level. The available bandwidth depends on the capacity of a given NANs network connections. A given NAN will allocate a bandwidth to each AGN and each BN connected to below it in the hierarchy. Then, each AGN connected below will have that allocated amount of bandwidth to allocate to any AGNs or BNs connected below it in the hierarchy. In this way, any bandwidths allocated lower in the hierarchy are guaranteed all the way up to the top of the hierarchy.

Figure 5:
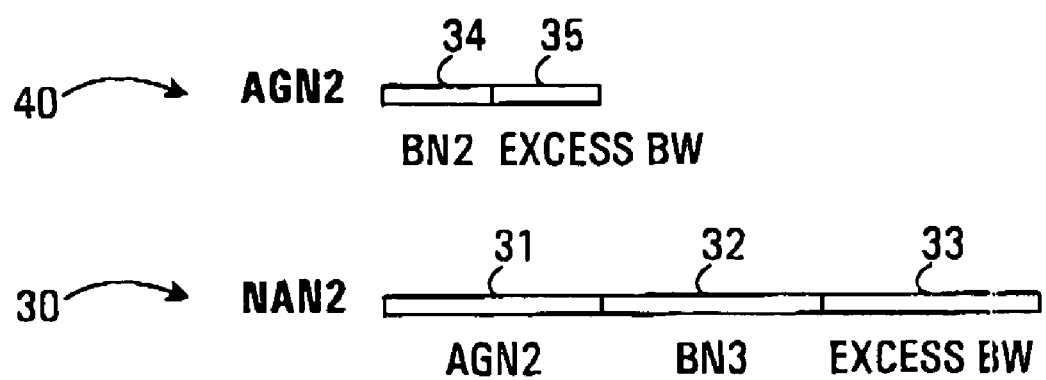
FIG. 5 is an example of a resource (i.e. bandwidth) allocation bar-chart associated with part of the network of FIG. 1.

FIG. 5 shows an example of a bandwidth allocation for part of the multi-hop backhaul network illustrated in FIG. 1, and more particularly for the part of the network below NAN2 123 in the hierarchy. The bandwidth allocation by NAN2 123 is indicated generally at 30. A portion of bandwidth 31 is allocated for AGN2 113, and a portion of bandwidth 32 is allocated for BN3 105, these being the only active AGNs or BNs directly below NAN2 in the hierarchy. The left over bandwidth 33, or "excess bandwidth" may be made available for delay tolerant traffic. The bandwidth allocation by AGN2 113 is indicated generally by 40. The amount of bandwidth available for allocation by AGN2 113 is the same as the amount 31 allocated to AGN2 113 by NAN2 123. The allocation shows a bandwidth portion 34 allocated for BN2 103, and excess bandwidth 35.

The excess bandwidths, for example resources 33,35 in the example above, are available to accommodate new connections should they be required. In another embodiment, excess bandwidth can be re-distributed to the existing dependent network nodes below in the hierarchy.

In other instances a particular network node may be allocated bandwidth from multiple other network nodes above it is the hierarchy. In such cases the total available bandwidth for a particular network node is greater than any one allocation from the multiple other network nodes above it is the hierarchy on which the particular network node is dependent.

Topology Discovery and Maintenance

Figure 6:
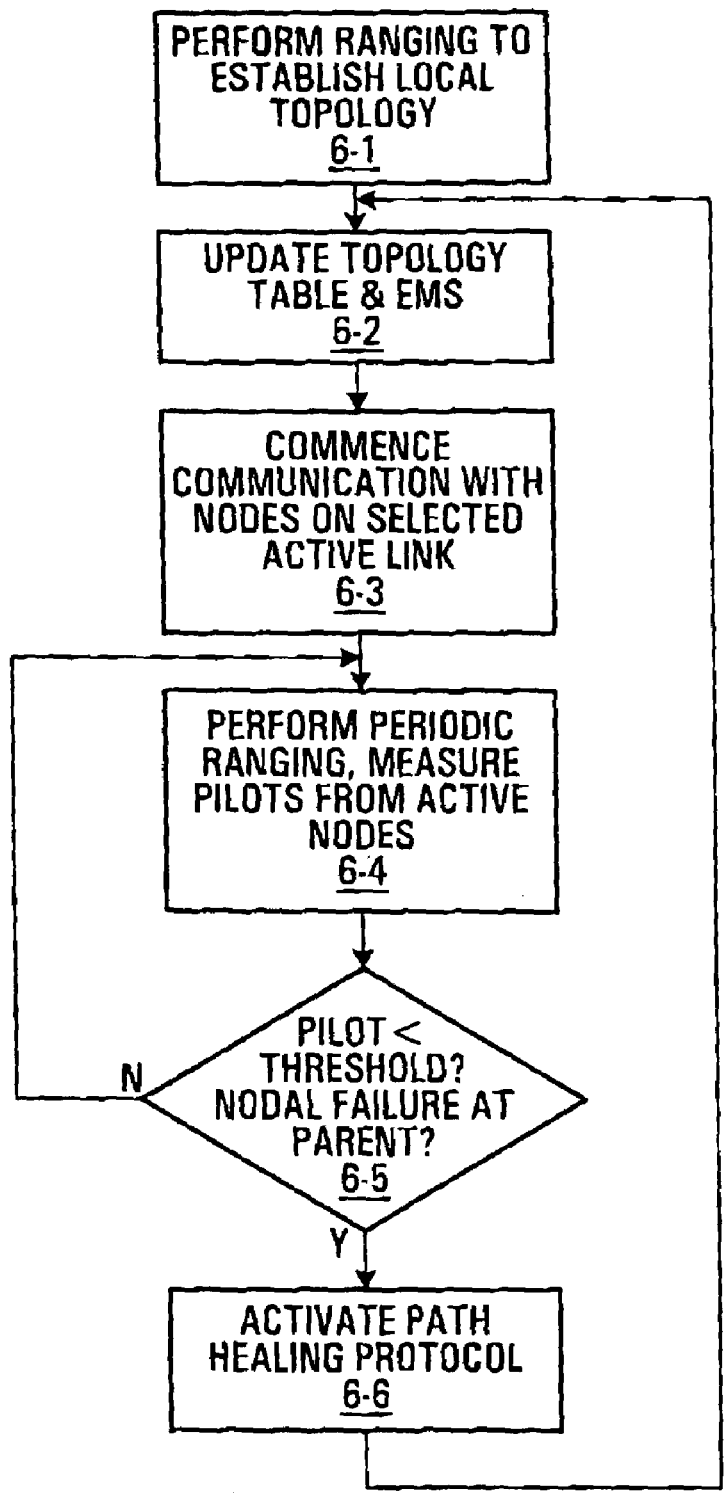
FIG. 6 is a flow chart depicting a method of network topology discovery and maintenance provided by an embodiment of the invention.

FIG. 6 is a flow chart illustrating a method of topology discovery and maintenance for dependent network nodes provided by an embodiment of the invention. The method includes initial ranging for the discovery of other adjacent constituent network nodes belonging to the multi-hop wireless backhaul network as well as a periodic ranging used to maintain up-to-date knowledge of the multi-hop wireless backhaul network.

For a network node initially accessing a multi-hop wireless backhaul network, a first step 6-1 is to perform ranging to establish a view of the local topology of the multi-hop wireless backhaul network. Network nodes hierarchically above the network node are sought and found during topology discovery. The purpose of topology discovery is, of course, for a network node to find another network node from which access to communication bandwidth can be allocated.

In specific embodiments in which each network node includes a number of spatially switched antennas, each spatially switched antenna remains active/operable for a period of time during which signals from hierarchically higher network nodes can be received on a particular spatially switched antenna. In some embodiments pilot signals are transmitted by each network node such that network nodes hierarchically below can detect network nodes above themselves in the hierarchy. In such embodiments the received pilot signals may vary in received strength due to antenna switching at the hierarchically higher network node (e.g. an AGN or an NAN) and the network node doing the ranging, since the best transmit and receive antennas may not be active simultaneously for both network nodes. Accordingly, in some embodiments, the network node doing the ranging is configured to dwell on each of its spatially switched antennas for a time longer than during normal operation to sufficiently determine another network node's best antenna beam on which to possibly establish a communication link. In some embodiments it is preferable for pilots signals to uniquely identify each network node that is capable of allocating communication bandwidth to other network nodes, at least as far as such adjacent network nodes can be distinguished from one another. The pilot signals can be transmitted continuously or intermittently.

A dwell time or period that a network node uses for ranging on each of its spatially switched antennas is preferably long enough to overcome the impact of fading and other channel distortions. Alternatively, if there is an extrinsic need to keep this period short, it is preferable that the spatially switched antennas are cycled through numerous times so that accurate channel information can be gathered and accounted for in the ranging process.

Signals from network nodes that can provide another network node access to communication bandwidth are ranked based on the received pilot signal strengths of each at the network node trying to find such a network node. Each such network node preferably is also associated with one position of the network node's spatially switched antenna on which the best signal measurements are taken for a particular network node transmitting pilot signals.

In some embodiments periodic ranging, which is discussed in detail below, is then only carried out on an ongoing basis for the spatially switched antennas receiving the best pilot signals. In other embodiments the network node doing the ranging adapts the time spent evaluating signals received at each spatially switched antenna so that more time is spent on the spatially switched antennas receiving the strongest pilot signals.

At a second step 6-2, using the results of the initial ranging carried out in step 6-1, the network node doing the initial ranging updates its own topology table with chosen active and alternate network nodes. The active and alternate network nodes are selected as a function of the initial ranging results. An example method of selecting these is described below with reference to FIG. 7. This information may also be sent upstream from the network node to update an EMS or Network Topology Manager after an active link is established to a selected network node from which pilot signal are received.

At a third step 6-3 the network node commences actual backhaul traffic communication on at least one active link established with another network node above it in the hierarchy.

At a fourth step 6-4 the network node perform periodic ranging during which received pilot signals are measured from the network nodes that have been used to establish active and alternate links. One purpose of periodic ranging is for a network node to maintain accurate frequency and timing synchronization with other network nodes it has established alternate links with, so that the respective alternate links are kept in a ready-to-use state. An example of periodic ranging is described below with respect to FIG. 8. In some embodiments periodic ranging is also used to maintain frequency and timing synchronization between a network node and the other network nodes with which the network node has established an active link.

At step 6-5, the network node determines whether or not the received pilot signals from each network node (to which an active or alternate link has been establish) are below a threshold. More generally, a determination is made as to whether each alternate link is still satisfactory for its purpose. If the pilot signals are above the threshold (no path, step 6-5) then the network node continues through steps 6-4 and 6-5. On the other hand, if a received pilot signal from a given network node is below the threshold (or fails some other condition) (yes path, step 6-5) it is assumed that there is a node failure. The network node then proceeds to step 6-6 in which a path-healing protocol is activated. The path-healing protocol is described in more detail below with reference to FIGS. 9A and 9B. After step 6-6 the method starts again at step 6-2. If the failure occurred at a network node providing an alternate link, then circuit traffic may not have been interrupted. However, if the failure occurred at an active node, circuit traffic from the child node would most certainly have to be re-routed.

Figure 7:
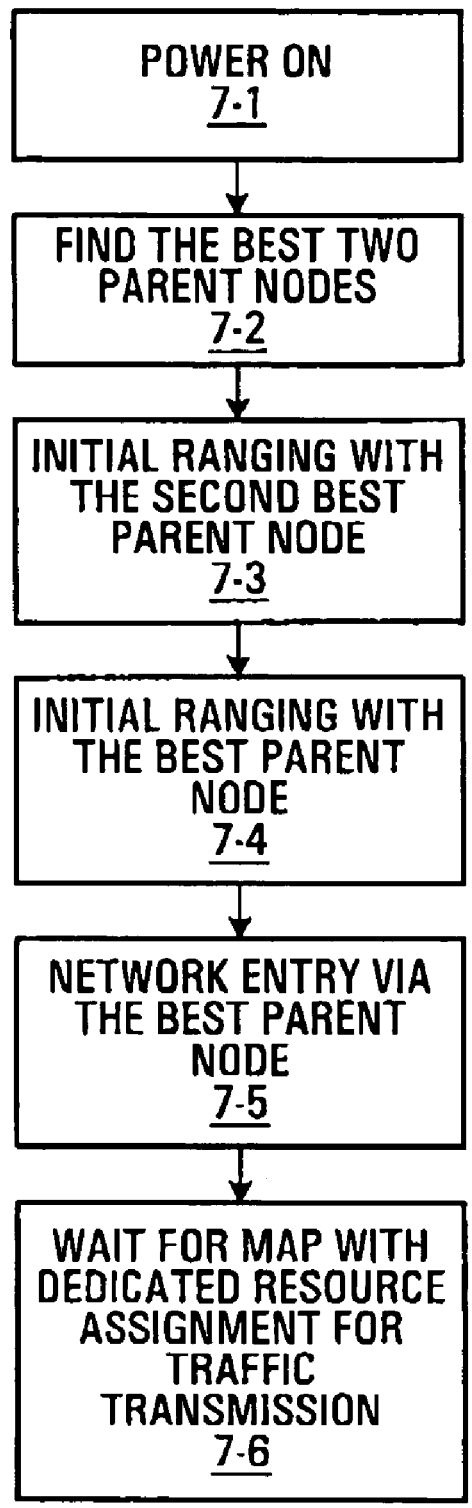
FIG. 7 is a flow chart depicting a method of network topology discovery and commencement of backhaul link use provided by an embodiment of the invention.

Shown in FIG. 7 is a flow chart depicting a method of network topology discovery and commencement of backhaul link use provided by an embodiment of the invention. The method depicted in the flow-chart is preferably employed by a network node that is either new to a multi-hop wireless backhaul network or by a network node that is being re-started. The method depicted in this flow-chart is similar to the steps 6-1 to 6-3, and those skilled in the art would appreciate that the methods depicted in FIGS. 6 and 7 could be combined without departing from the scope of the invention.

With further reference to FIG. 7, a first step 7-1 is the power-on of a network node. Then at step 7-2 the network node attempts to identify at least two network nodes above itself in the hierarchy, which are ranked in order of preference. It is possible that some network nodes will only find one such network node. At step 7-3 and 7-4 the network node performs initial ranging with the second best and then best discovered nodes, respectively. The initial ranging is preferably carried out to obtain accurate frequency and timing synchronization as well as to set-up communication and service (and maintenance) channels.

After the initial ranging with the best network node is complete, the network node enters the multi-hop wireless backhaul network at step 7-5 via the best network node it discovered. At this point, the multi-hop wireless backhaul network is aware of the new network node, and central communications elements such as the EMS are now aware of it. The network node waits at step 7-6 for an acceptance message from the best network node it discovered. In some instance the acceptance message is in the form of a MAP, which is discussed in more detail below. The MAP carries with it a dedicated resource (i.e. bandwidth) assignment (e.g. frequency, time-slots, scheduling information etc.) that enables the flow of backhaul traffic between the network node and the best node above. Once the MAP is received by the node the node then has an active link on which backhaul traffic can be transported to and from the node.

Periodic Ranging

There is normally no backhaul traffic transported on an alternate links between network nodes. However, in some embodiments a periodic ranging is performed so that the alternate link can be maintained. Periodic ranging between the two network nodes on opposite ends of an alternate link maintains accurate frequency and timing synchronization so that the alternate link is kept in a ready-to-use state.

For embodiments featuring spatially switched antennas, it is preferable that the periodic ranging is performed by each pair of network nodes (having an alternate link), when their spatially switched antennas are best positioned and active with respect to one another. For example, with further reference to FIG. 4, the BN4 107 preferably performs a periodic ranging procedure on a pilot signal sent from the AGN3 119 when antenna beams 317 and 315 are both on simultaneously. On the other hand, periodic ranging would occur between the NAN3 129 and the AGN3 119 when antenna beam 305 and spatially switched antenna beam 313 are both active simultaneously.

In multi-hop wireless backhaul networks featuring spatially switched antennas on a single frequency in TDM, for example, the multi-hop wireless backhaul network 300 shown in FIG. 4, multiple ranging operations may occur simultaneously so long as they do not conflict with each other. For example, periodic ranging for the AGN3 119 can only happen with one of the BN4 107 and the NAN3 129 at a time. However, periodic ranging between the NAN3 129 and the BNS 109 can occur simultaneously with periodic ranging between the AGN3 119 and the BN4 107.

Figure 8:
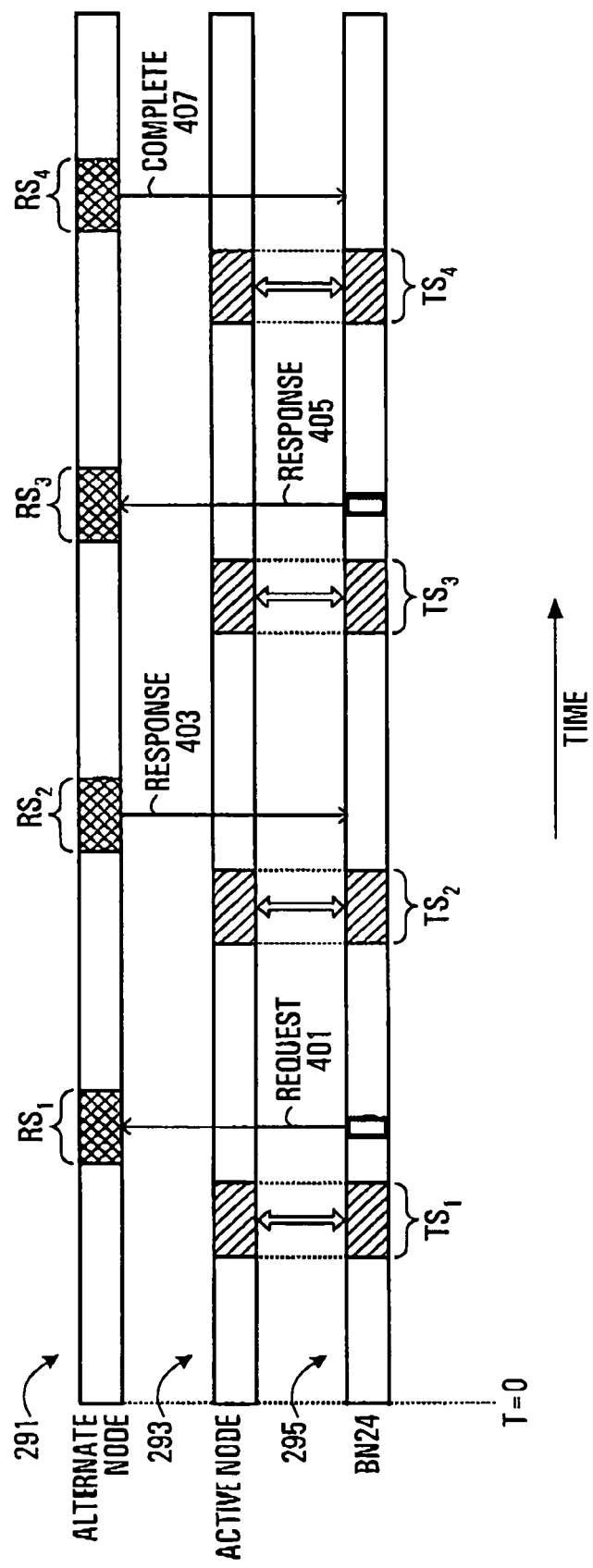
FIG. 8 is a timing diagram depicting a method of periodic ranging for a node having active and alternate nodes above it in the hierarchy, provided by an embodiment of the invention.

Shown in FIG. 8 is an example of a timing diagram depicting a signalling exchange for a network node BN24 having active and alternate network nodes. The BN24 has a signalling timeline 295, the active node has a signalling timeline 293 and the alternate node has a signalling timeline 291.

The active node schedules and provides transmission time slots $TS_1, TS_2, TS_3, TS_4$ to the BN24. During the transmission time slots $TS_1, TS_2, TS_3, TS_4$ the active node and the BN24 transmit and receive backhaul traffic from one another. Outside of the transmission time slots $TS_1, TS_2, TS_3, TS_4$ the active node and the BN24 do not communicate with one another and the BN24 is generally prohibited from contacting its active node. However, the BN24 is generally free to communicate with other nodes.

In some embodiments of the invention network nodes, such as the BN24, use the time outside the transmission time slots provided by active nodes (e.g. $TS_1, TS_2, TS_3, TS_4$) to autonomously perform periodic ranging with alternate nodes. As noted above, a network node will perform an initial ranging with its alternate node(s) hierarchically above it. To achieve the periodic ranging function, the alternate node will be aware of the node and provide ranging time slots in which the alternate node expects periodic ranging requests from the particular dependent network node. In some embodiments the ranging time slots will include pilot signals that the network node can measure as well as a service channel through which maintenance signalling is enabled.

For example, as shown in FIG. 8, the BN24 transmits a ranging request 401 to its alternate node during a ranging time slot $RS_1$ provided by the alternate node. In the example shown in FIG. 8, a ranging response 403 from the alternate node is transmitted in a next ranging time slot $RS_2$ which follows transmission time slot $TS_2$. The response contains frequency and timing information. In other scenarios a ranging response is transmitted by the alternate node before transmission time slot $TS_2$ either within ranging time slot $RS_1$ or in another ranging time slot (not shown) provided by the alternate node.

After transmission time slot $TS_3$ and during a ranging time slot $RS_3$ (provided by the alternate node) the BN24 responds to the alternate node's previous ranging response 403 with a ranging response 405 confirming frequency and timing information. The ranging response 405 is used to confirm (or not) that the ranging response 403 was received and that the BN24 has updated its frequency and timing synchronization with the alternate node. In a subsequent ranging time slot $RS_4$ the alternate node sends a ranging complete message 407 to the BN24 to confirm that frequency and timing information is correct. If it is not correct the process continues in subsequent ranging time slots. The ranging response 407 is used to confirm (or not) that the ranging response 405 was received and that the alternate node has updated its frequency and timing synchronization with the BN24.

Alternatively, if either the ranging response 405 or 407 indicated that either the BN24 or the alternative node did not receive an appropriate response or complete their respective synchronization procedures, then the process of periodic ranging would continue until both the BN24 and the alternative node were satisfied.

Scheduling

For embodiments in which some network nodes include spatially switched antennas in the BNs and/or the AGNs, TDM scheduling needs to be performed in order that the various network nodes are looking at each other at the same time, and sending/receiving data to/from the appropriate other network node at the right time. Any method of scheduling can be employed which achieves this effect. Two specific scheduler implementations are described herein by way of example.

Scheduling is performed within the multi-hop wireless backhaul network in such a manner that each of the active connections is allocated the required amount of bandwidth. As indicated above, preferably, this bandwidth is dynamically allocated. This dynamic allocation of bandwidth can be performed at the EMS, or alternatively, the dynamic allocation function can be distributed to the network nodes in the network.

In a first embodiment, a scheduler is provided which provides a top-level overall scheduling operation. This scheduler might for example be part of the previously discussed EMS. The scheduler has an understanding of the bandwidth required on each connection and makes resource assignments on the basis of these requirements.

On the basis of this, resource assignments are generated by the scheduler. A resource assignment is based on the network topology, the traffic load and channel conditions of link between each network node and network nodes that are dependent on it. In an example implementation, this assignment indicates the following information:

a) for traffic: the network node IDs of a connection, the time period of communications for these two network nodes, the code and modulation scheme and transmission power, etc.

Preferably, the scheduler also takes care of scheduling periodic ranging operations discussed above. In this case, the scheduling operation also includes:

b) a ranging window assignment which to a given network node when it should be available for ranging requests.

The following is an example of a resource assignment message which might be sent to all network nodes by the EMS for example, where T1, T2 etc. indicates a TDM slot or slots for scheduling the particular traffic, MCS is a particular coding and modulation scheme, and TxP is a particular transmit power. Of course, different or additional parameters can alternatively be employed in the resource assignment message.

Traffic:
NAN<->AGN1: T1, MCS and TxP (for both directions)
NAN<->AGN2: T2, MCS and TxP (for both directions)
AGN1<->BN2: T3, MCS and TxP (for both directions)
AGN2<->BN1: T4, MCS and TxP (for both directions)
Periodic ranging:
AGN1<->BN1: T5, MCS and TxP (for both directions)
AGN2<->BN2: T6, MCS and TxP (for both directions)

In most implementations, such an assignment would not change frequently.

In another embodiment, the scheduling is performed in a distributed manner. Each node has a scheduler, for example as part of the previously described topology manager.

Preferably, for a given connection, the node which is higher in the hierarchy determines the following information:

a) for traffic, the resource assignment for communication with all nodes connected below includes the time period, code and modulation scheme and transmission power, etc.

b) in embodiments employing periodic ranging, the resource assignment includes a ranging window to enable periodic ranging with nodes who select this node as their alternate parent node.

This is sent in a message or messages, and preferably a protocol is executed in order to accept and or re-negotiate the proposed schedule as required.

The distributed scheduling approach is more dynamic and changes may be completed faster in situations such as when path reconfiguration commands needs to occur.

The following is an example of messaging which might take place in a distributed scheduling operation, where the parameters are the same as described previously for the centralized scheduler:

Resource assignment message sent by NAN:
Traffic:
NAN<->AGN1: T1, MCS and TxP (for both directions)
NAN<->AGN2: T2, MCS and TxP (for both directions)
Resource assignment message sent by AGN1:
Traffic:
AGN1<->BN2: T3, MCS and TxP (for both directions)
Periodic ranging:
AGN1<->BN1: T5, MCS and TxP (for both directions)
Resource assignment message sent by AGN 2:
Traffic;
AGN2<->BN1; T4, MCS and TxP (for both directions)
Periodic ranging
AGN2<->BN2: T6, MCS and TxP (for both directions)

Path Healing

As discussed previously, in another embodiment, a multi-hop wireless backhaul network is provided which has a path-healing capability enabling rapid reconfiguration of virtual circuit connections, in the event of link and/or network node failure and/or for load-balancing.

It was also discussed previously that emulated circuits are established between pairs of circuit endpoints, and alternate connections are maintained using periodic ranging and signalling. In some embodiments, the additional nodes above in the hierarchy are used to define, for one or more and preferably all of the active links, a respective "alternate link. A set of example "alternate links" are shown in FIG. 1 using dashed lines. Alternate links can be described as keep-alive channels. Backhaul data is not regularly transmitted on the alternate links as long as the corresponding active links are operational and provide enough bandwidth for the respective network nodes they are associated with. That is, the alternate links are used as hot-standbys, onto which backhaul traffic can be re-routed, in the event that any of the active links fail, or if extra bandwidth is needed. In some embodiments, critical bandwidth may be pre-allocated for alternate links as needed in order to ensure that alternate links have some bandwidth in the event of a failure.

Alternate link information is preferably maintained in a similar form to the previously discussed active link information, as part of the topology information, for example maintained by the topology manager. Returning again to the topology tables shown in FIGS. 2B, 2C and 2D, the topology information for alternate links is generally indicated at 41,43, 45 respectively for the BN1 101, the AGN1 111 and the NAN1 121, respectively, of FIG. 1.

Each network node needs to know when to transmit and to whom. As indicated above, this can be scheduled by a centralized scheduler or in a distributed manner by schedulers on individual nodes.

For example, a BN knows when to transmit on an active link and when to perform periodic ranging on an alternate link, and on which spatially switched antennas. An AGN knows when to transmit on active and alternate links below it in the hierarchy, and when to transmit on active and alternate links above it in the hierarchy. Finally, for the NAN, for each sector the NAN knows when to communicate with network nodes below it in the hierarchy.

In the event of a failure of a BN, there is not much that can be done as that is at the bottom of the hierarchy, at least in the context of path healing. Nodal redundancies can be employed to provide a healing capability for failed BNs. In the event of a failure of an AGN or NAN, path healing can be employed. By virtue of the design of the multi-hop wireless backhaul network embodiment featuring alternate links, a network node whose normal active link has been cut off will be able to communicate at least for the purpose of signalling on the alternate link.

In a first embodiment, the path healing is implemented centrally in conjunction with the previously described centralized scheduler. In this embodiment, after a failure is detected, the centralized scheduler is informed of this fact, and the entire resource assignment is re-worked as necessary in order to provide capacity to replace the capacity of the failed active connection(s).

In a preferred embodiment, only a network node in the hierarchy above where the failure occurred reports the failure. Thus, a NAN would report the failure of an AGN or BN directly below it; an AGN would report the failure of an AGN or BN directly below it. If a NAN fails, the EMS should be able to detect this.

In another embodiment, the path healing is implemented in a distributed manner. The following is an example of a distributed process to implement path healing:

i. A network node (AGN or NAN) above the failed AGN/NAN detects failure of the AGN/NAN;

ii. A network node detecting the failure informs the rest of the multi-hop wireless backhaul network of the failure to the extent it can. In this distributed approach this step may not be necessary in view of step 3 below. However, performing step 2 will allow other network nodes in the multi-hop wireless backhaul network to anticipate the need to establish new active links to the orphaned network node below the failed network node;

iii. Each network node below the failed AGN/NAN (BNs or AGNs) attempts to establish a traffic connection over its alternate connection. This involves a negotiation over the existing signalling bandwidth between schedulers on two sides of the alternate connection to agree upon scheduling constraints for the traffic, for example bandwidth, and time slots for the traffic. In preferred implementations, the higher a given network node is in the hierarchy, the higher the priority is in negotiating scheduling constraints. The hierarchically higher network node may be allowed to dictate the scheduling in some embodiments. This is because a network node higher in the hierarchy (for example an AGN or NAN) will have less scheduling flexibility than a network node lower in the hierarchy (a BN). If the network node at the opposite end of the alternate connection is not a NAN, then the additional traffic also needs to be scheduled from that network node on up through the hierarchy. This may simply involve negotiating an increase in the bandwidth an existing active connection.

iv. Once these bandwidths are configured/scheduled, the virtual circuit will have moved from its original path to a new path and traffic can flow on the new path.

Partial Path Healing

The negotiated bandwidths are preferably large enough to implement completely the bandwidth of any virtual circuits which passed through the failed node. In the event there is insufficient bandwidth to achieve this, preferably a partial-healing solution is provided in which a reduced bandwidth is provided for the virtual circuit which allows at least signalling communication, and preferably provides a virtual channel for delay sensitive traffic.

Referring again to the example of FIG. 1, one specific example set of alternate links is also shown in FIG. 1. The BN1 101 is shown to have an alternate link 81 to the NAN1 121. The BN2 103 has an alternate link 83 to the AGN1 111. The BN3 105 has an alternate link 89 to the AGN2 113. The AGN1 111 has an alternate link 85 to the NAN2 123. The AGN2 113 has an alternate link 87 to the NAN1 121.

In an example of the use of alternate links, in the event that AGN1 111 fails completely or is forced to re-distribute bandwidth available to it, such that circuit 93 is no longer operable, the BN1 101 could switch to its alternate link 81 to establish a circuit 91 with the NAN 121. Having the option to switch to the circuit 91 from the circuit 93 provides the BN 101 with the ability to re-route its circuit traffic.

In some embodiments, backup circuits, for example circuit 91, are pre-established as part of the path-healing mechanism. In other embodiments, circuit 91 would not be established until the failure occurs.

The topology information, and the EMS, discussed previously, can be advantageously used by embodiments of the invention providing the path-healing method. The EMS can also be used for path reconfiguration to deal with network node failures and long-term load balancing. The EMS can instigate path healing for load balancing, whereas local nodes typically instigate path healing in the event of failures.

Figure 9A:
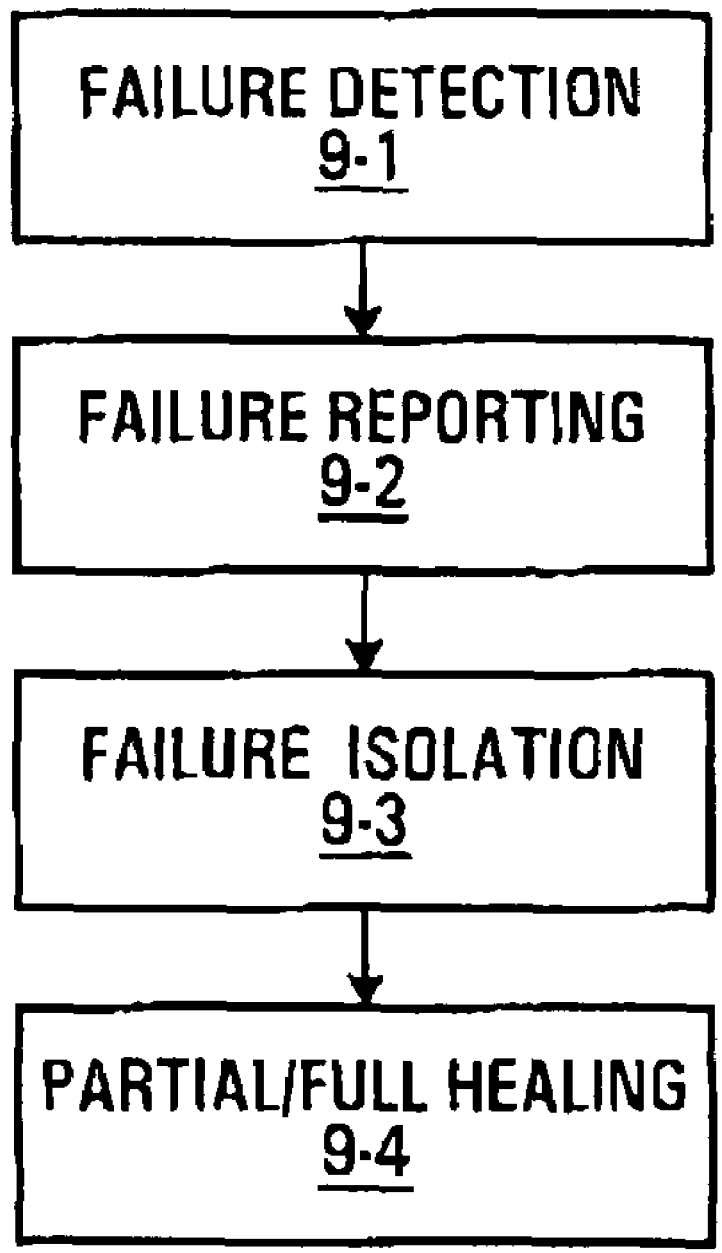
FIG. 9A is a flow chart depicting a method of path-healing provided by an embodiment of the invention.

FIG. 9A shows a flow-chart depicting a method of path-healing provided by an embodiment of the invention. Starting at step 9-1, it is to be understood to this point that during normal operation each network node measures signal strength from other network nodes from which signals are received. In some embodiments pilot signals are used for this purpose. If the signal strength (e.g. of a pilot signal) from a network node is below a threshold the network nodes having links to it that would be measuring the signal strength assume that the network node has failed. In other words nodes assume a failure has occurred at a network node that they had a communication link with if the signal from the presumably failed node is below a threshold or if some other failure condition occurs.

At step 9-2 the failure detected at step 9-1 is reported around the multi-hop wireless backhaul network. If the failed network node had an active link to a network node below it, the network node below would have detected the loss of service (i.e. the failure). However, preferably, the network node hierarchically below does not immediately attempt to report failure. Instead, an active network node hierarchically above the failed network node signals a network topology manager, such as an EMS, to indicate that one of the network nodes below itself in the multi-hop wireless backhaul network has failed. The network topology manager then informs the entire network, for example by sending a broadcast message through the multi-hop wireless backhaul network on all operating active links for a first duration of time (e.g. 20 ms).

If the active network node hierarchically below the failed network node does not detect the broadcast message sent through the multi-hop wireless backhaul network, the network node then proceeds to report the failure of its active parent node. The network node does so by reporting the failure of its active node to its alternate node. In some embodiments this occurs during a subsequent ranging time slot provided by the alternate to the particular network node. The alternate node then updates the network topology manager.

There is the possibility that all listed active and alternate nodes above a given network node have failed. In this scenario the network node can try to re-enter the multi-hop wireless backhaul network as if it were a new node. If no alternatives are available for a new connection, communication to/from that network node is lost until the at least one of the network nodes above is repaired.

Through the process of reporting in step 9-2 the network node failure(s) the information needed to isolate the failed network node(s) eventually reaches the network topology manager. As described above, a network topology manager (e.g. an EMS) operates during normal conditions to keep and up-to-date record of all active links and circuits through out the multi-hop wireless backhaul network. Thus, at step 9-3, the network topology manager reviews its latest record of known active links and circuits to isolate the failed network node. The network topology manager then acts to identify alternate links around the failed node.

With an updated view of the multi-hop wireless backhaul network the network topology manager initiates the partial/full path healing of the multi-hop wireless backhaul network at step 9-4. Alternate nodes are switched to active nodes status as required and available bandwidth is dynamically re-allocated to re-establish communications. The affected network nodes update their own topology tables and respond accordingly to dynamically re-allocate resources available to them. In some embodiments highest-priority traffic is taken care of first with the possibility that lower priority traffic is dropped. As such, critical circuits and traffic are preferably not lost.

Figure 9B:
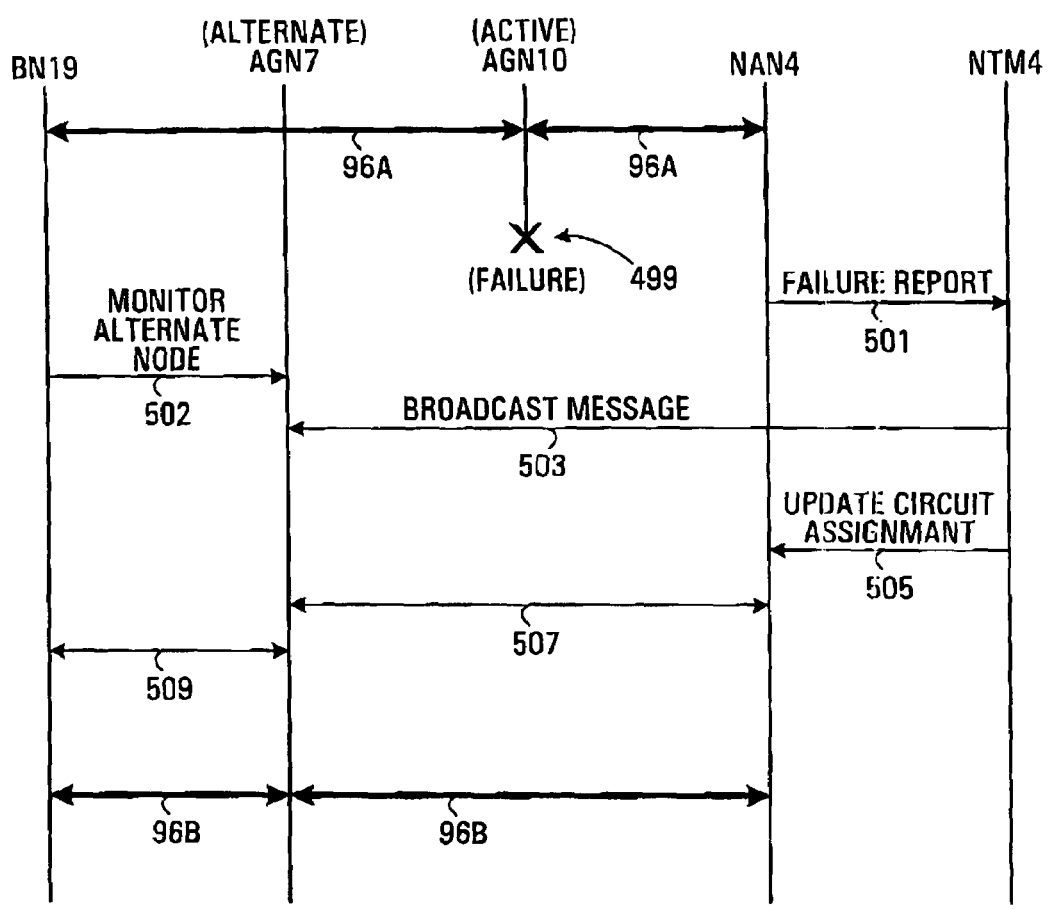
FIG. 9B is a signalling diagram illustrating an example of the method of path-healing depicted in the flow chart of FIG. 9A.

FIG. 9B shows a signalling diagram illustrating circuit connections, and signalling exchanges as an example of a network node failure within a multi-hop wireless backhaul network and the subsequent application of the method path-healing described with respect to FIG. 9A. The multi-hop wireless backhaul network includes a Network Topology Manager (NTM) NTM4, a NAN4, an AGN7 and AGN10 and a BN19. The NAN4 is the active node for both AGN7 and AGN10, at least at first, the AGN10 is the active node for the BN19 and the AGN7 is the alternative node.

The BN19 and the NAN4 are the circuit end-points for a circuit 96A, shown in the signalling diagram in bold to illustrate an active communication link between the BN19 and the NAN4. However, since the BN19 does not have the NAN4 as a parent, circuit traffic cannot flow directly from the BN19 to the NAN4. The BN19 is connected to the NAN4 through the AGN10, which is the active node hierarchically above for the BN19. Accordingly, circuit 96A is relayed through the AGN10. When the AGN10 experiences a failure as indicated at 499 the circuit 96A between the NAN4 and the BN19 is broken.

The BN19 and the NAN4, during normal operations, would both detect the failure of the AGN10. At 501 the NAN4 reports the failure of the AGN10 to the network topology manager NTM4, while during 502 the BN19 monitors its alternate node, the AGN7. At 503 the network topology manager NTM broadcasts a message about the failure 499, which is received by the AGN7. Subsequently, the network topology manager NTM4 transmits an updated circuit assignment to the NAN4 at 505. The NAN4 then sends the updated circuit assignment to the AGN7 at 507; and the AGN7 sends the updated circuit assignment to the BN19.

The updated circuit assignment causes the BN19 to switch the AGN7 to be its active node hierarchically above. Subsequently, the AGN7 dynamically allocated bandwidth to the BN19. As a result, circuit 96B between the NAN4 and the BN19 is established. The circuit 96B employs the AGN7 as a relay node for circuit traffic sent between the NAN4 and the BN19.

What has been described is merely illustrative of the application of the principles of the invention. Other arrangements and methods can be implemented by those skilled in the art without departing from the spirit and scope of the present invention. For example, in some embodiments of the invention a network node in a first state is configured to function as a BN and in a second state, the same network node, is configured to function as an AGN. In some embodiments, a change of state is caused by a system trigger, such as an expansion of a multi-hop wireless backhaul network including the introduction of one or more new BNs. Moreover, it is also to be understood that in some embodiments BNs may communicate using service and maintenance channels to exchange Operation and Management (OAM) information with one another, but not backhaul network traffic.

We claim:

1. A multi-hop wireless backhaul network comprising:
   backhaul network nodes comprising:
      at least one NAN (network access node);
      a plurality of BNs (base nodes);
      a plurality of AGNs (aggregation nodes) each performing a switching function in relaying traffic between at least one of the base nodes and at least one of the network access nodes;
      wherein a hierarchical topology of active wireless connections is established with the at least one network access node at the top of the topology, and the base nodes at the bottom of the topology; and wherein there are no active wireless connections between backhaul network nodes of a same type, at a same level of the hierarchical topology.

2. A multi-hop wireless backhaul network according to claim 1 in combination with an access network comprising a plurality of access network nodes for which the multi-hop wireless backhaul network is providing backhaul functionality.

3. A multi-hop wireless backhaul network according to claim 2 wherein at least some of the access network nodes are co-located and connected to or integrated with respective nodes of the multi-hop wireless backhaul network.

4. A multi-hop wireless backhaul network according to claim 3, wherein the access network is a cellular wireless access network, and each access network node is a base station transceiver.

5. A multi-hop wireless backhaul network of claim 4 in combination with an element management system configured to perform management functions for the multi-hop wireless backhaul network connected to the multi-hop wireless backhaul network via a metro network, and further comprising a base station controller co-located with the element management system, the base station controller providing a control operation for the base station transceivers.

6. A multi-hop wireless backhaul network according to claim 3 configured to establish a plurality of virtual circuits through said hierarchical topology, each virtual circuit having an allocated bandwidth for delay-sensitive traffic, at least some of the virtual circuits being multi-hop virtual circuits, wherein each virtual circuit either has a first circuit end-point in one of the at least one NAN or passes through one of the at least one NAN to an external end-point, and has a second circuit end-point in either a BN of said plurality of BNs or an AGN of said plurality of AGNs, which second circuit end-point is combined with, co-located with or locally connected to an access network node of said access network and provides backhaul capacity for the access network node.

7. A multi-hop wireless backhaul network according to claim 6 wherein at least one BN or AGN is a second end-point for two or more virtual circuits.

8. A multi-hop wireless backhaul network according to claim 7 wherein at least two or more virtual circuits as established on respective distinct active wireless connections from the BN or AGN.

9. A multi-hop wireless backhaul network according to claim 1 configured to establish a plurality of virtual circuits through said hierarchical topology, each virtual circuit having an allocated bandwidth for delay-sensitive traffic, at least some of the virtual circuits being multi-hop virtual circuits.

10. A multi-hop wireless backhaul network according to claim 9 wherein each virtual circuit has a first circuit end-point in one of the at least one NAN, and has a second circuit end-point in either a BN of said plurality of BNs or an AGN of said plurality of AGNs.

11. A multi-hop wireless backhaul network according to claim 9 wherein each virtual circuit passes through one of said at least one NAN and has a first circuit end-point external to the BNs, AGNs, and at least one NAN, and has a second circuit end-point in either a BN of said plurality of BNs or an AGN of said plurality of AGNs.

12. A multi-hop wireless backhaul network of claim 11 in combination with an element management system configured to perform management functions for the multi-hop wireless backhaul network connected to the multi-hop wireless backhaul network via a metro network, and further comprising a base station controller co-located with or locally connected to the element management system, the base station controller providing a control operation for the base station transceivers, wherein each the first end-point of each virtual circuit is in the element management system.

13. A multi-hop wireless backhaul network according to claim 12 wherein each virtual circuit is an Ethernet virtual circuit.

14. A multi-hop wireless backhaul network according to claim 9 wherein each virtual circuit is an end-to-end layer 2 circuit emulation, and wherein for each multi-hop virtual circuit.

15. A multi-hop wireless backhaul network according to claim 1 further comprising a scheduler which performs a scheduling operation for nodes in the topology and transmits at least one message containing resource assignment information.

16. A multi-hop wireless backhaul network according to claim 15 wherein the at least one message comprises identifiers of two nodes for an active connection, and at least one of: time slots of communications, an encoding format, a signaling format, a modulated format and transmission power.

17. A multi-hop wireless backhaul network according to claim 1 further comprising a scheduler on each node in the network, the schedulers collectively performing a scheduling operation to determine for each connection which two nodes are involved in the connection; and at least one of: time slots of communications, an encoding format, a signaling format, a modulated format and transmission power.

18. A multi-hop wireless backhaul network according to claim 1, configured to dynamically allocate bandwidth to each of the active connections.

19. A multi-hop wireless backhaul network according to claim 1 wherein each node maintains respective topology information identifying at least any active connections the node is participating in or any nodes with which the node has an active connection.

20. A multi-hop wireless backhaul network according to claim 1 wherein each AGN comprises a plurality of spatially switched antennas, and a transceiver operating in a TDM (time division multiplex) basis on the plurality of spatially switched antennas.

21. A multi-hop wireless backhaul network according to claim 20 wherein each BN comprises a plurality of spatially switched antennas, and a transceiver operating in a TDM (time division multiplex) basis on the plurality of spatially switched antennas.

22. A multi-hop wireless backhaul network according to claim 21 wherein each NAN comprises a plurality of antennas in a multi-sector antenna arrangement and a respective transceiver operating on each sector.

23. A multi-hop wireless backhaul network according to claim 22 wherein each active connection is established between a respective pair of said antennas on two nodes in the network, and wherein each connection is allocated respective active time slots during which the connection is active.

24. A multi-hop wireless backhaul network according to claim 23 wherein upon at least one of power up, initialization and command, each AGN and each BN is configured to perform a ranging function to identify another node with which the AGN/BN can establish an active connection as part of said hierarchical topology, and in an attempt to identify at least one alternate node with which the AGN/BN can establish an alternate connection.

25. A multi-hop wireless backhaul network according to claim 23 wherein each alternate connection is established between a respective pair of antennas, and wherein each alternate connection is allocated respective signalling time slots during which the alternate connection is available for ranging or signalling.

26. A multi-hop wireless backhaul network according to claim 22 wherein each NAN dynamically allocates bandwidth to each AGN and/or BN with which the NAN has an active connection, and each AGN allocates bandwidth to each AGN and/or BN with which the AGN has an active connection.

27. A multi-hop wireless backhaul network according to claim 26 further configured to establish a plurality of alternate connections in addition to the active connections in said hierarchical topology.

28. A multi-hop wireless backhaul network according to claim 27 further configured to perform automatic path healing upon failure of an active connection or a node in the network, using at least one of the plurality of alternate connections.

29. A multi-hop wireless backhaul network according to claim 28 configured to dynamically allocate a bandwidth at least for signalling and/or ranging each alternate connection, and to allocate bandwidth for traffic for each alternate connection employed in path healing.

30. A multi-hop wireless backhaul network according to claim 1 further configured to establish a plurality of alternate connections in addition to the active connections in said hierarchical topology.

31. A multi-hop wireless backhaul network according to claim 30 further configured to perform automatic path healing upon failure of an active connection or a node in the network, using at least one of the plurality of alternate connections.

32. A multi-hop wireless backhaul network according to claim 31 wherein at least some of the BNs have respective alternate connections to either an AGN of said plurality of AGNs or to a NAN of said at least one NAN, and wherein at least some of the AGNs have respective alternate connections to either another AGN of said plurality of AGNs or to a NAN of said at least one NAN.

33. A multi-hop wireless backhaul network according to claim 31 configured to allocate at least a signalling and/or ranging bandwidth for each alternate connection.

34. A multi-hop wireless backhaul network according to claim 31 configured to detect when a failure has occurred affecting at least one of said active connections, and to maintain communication between the endpoints of the connection by using at least one alternate connection.

35. A multi-hop wireless backhaul network according to claim 34 configured to perform automatic path healing upon failure by:
a node in the hierarchy directly below the failure establishing an active connection over an alternate connection from the node.

36. A multi-hop wireless backhaul network according to claim 35 wherein for a virtual circuit using the active connection or node which failed, performing automatic path healing comprises:
moving the virtual circuit to use at least one alternate connection, and scheduling bandwidth for the virtual circuit along at least each connection to form part of the virtual circuit after moving which was not previously part of the virtual circuit.

37. A multi-hop wireless backhaul network according to claim 36 further comprising a scheduler which performs a scheduling operation on the nodes in the network and transmits one or more resource assignment messages containing resource assignment information.

38. A multi-hop wireless backhaul network according to claim 37 wherein the resource assignment message comprises identifiers of two nodes for a connection, and at least one of: time slots of communications, an encoding format, a signaling format, a modulated format and transmission power.

39. A multi-hop wireless backhaul network according to claim 38 wherein the scheduler generates new resource assignment information as part of the automatic path healing.

40. A multi-hop wireless backhaul network according to claim 36 further comprising a scheduler on each node in the network, the schedulers collectively performing a scheduling operation to determine for each connection which two nodes are involved in the connection; and at least one of: time slots of communications, an encoding format, a signaling format, a modulated format and transmission power.

41. A multi-hop wireless backhaul network according to claim 40 wherein after a failure, the schedulers collectively perform a new scheduling operation.

42. A multi-hop wireless backhaul network according to claim 1 wherein each AGN and each BN is configured to perform a ranging function to identify network nodes with which the AGN/BN can establish a connection.

43. A multi-hop wireless backhaul network according to claim 1 wherein upon at least one of power up, initialization and command, each AGN and each BN is configured to perform a ranging function to identify another node with which the AGN/BN can establish a connection.

44. A multi-hop wireless backhaul network according to claim 1 in combination with an element management system configured to provide management functions for the multi-hop wireless backhaul network.

45. A multi-hop wireless backhaul network according to claim 44 wherein the element management system is connected to the multi-hop wireless backhaul network via another transport network.

46. A multi-hop wireless backhaul network according to claim 44 wherein the element management system is connected to the multi-hop wireless backhaul network via a metro network.

* * * * *

UNITED STATES PATENT AND TRADEMARK OFFICE
CERTIFICATE OF CORRECTION

PATENT NO.      : 7,646,752 B1                                Page 1 of 1
APPLICATION NO. : 10/747942
DATED           : January 12, 2010
INVENTOR(S)     : Periyalwar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1779 days.

Signed and Sealed this

Twenty-eighth Day of December, 2010

David J. Kappos
*Director of the United States Patent and Trademark Office*